US008078688B2

(12) United States Patent
Ansari et al.

(10) Patent No.: US 8,078,688 B2
(45) Date of Patent: Dec. 13, 2011

(54) FILE SHARING THROUGH MULTI-SERVICES GATEWAY DEVICE AT USER PREMISES

(75) Inventors: Amir Ansari, Dallas, TX (US); George A. Cowgill, Farmersville, TX (US); Leon E. Nicholls, Plano, TX (US); Atousa Raissyan, Potomac, MD (US); Jude P. Ramayya, Wylie, TX (US); Ramprakash Masina, Wylie, TX (US)

(73) Assignee: Prodea Systems, inc., Plano, TX (US)

( * ) Notice: Subject to any disclaimer, the term of this patent is extended or adjusted under 35 U.S.C. 154(b) by 0 days.

(21) Appl. No.: 12/521,752

(22) PCT Filed: Sep. 7, 2007

(86) PCT No.: PCT/US2007/019531
§ 371 (c)(1),
(2), (4) Date: Apr. 28, 2010

(87) PCT Pub. No.: WO2008/085202
PCT Pub. Date: Jul. 17, 2008

(65) Prior Publication Data
US 2010/0241711 A1 Sep. 23, 2010

Related U.S. Application Data

(60) Provisional application No. 60/882,865, filed on Dec. 29, 2006, provisional application No. 60/882,862, filed on Dec. 29, 2006.

(51) Int. Cl.
*G06F 15/16* (2006.01)
(52) U.S. Cl. .................. 709/217; 709/203; 709/226

(58) Field of Classification Search .................. 709/203, 709/217, 226
See application file for complete search history.

(56) References Cited

U.S. PATENT DOCUMENTS
6,301,609 B1  10/2001  Aravamudan et al.
(Continued)

FOREIGN PATENT DOCUMENTS
EP    1113659    7/2001

OTHER PUBLICATIONS

Duenas, Juan C. An End-to-End Service Provisioning scenario for the Residential Environment, IEEE Communications Magazine, Sep. 2005, pp. 94-100.

(Continued)

*Primary Examiner* — Phuoc Nguyen
(74) *Attorney, Agent, or Firm* — Haynes and Boone, LLP

(57) ABSTRACT

A system for providing and managing file sharing services of one or more endpoint devices comprise a first interface for enabling bi-directional communications with one or more of the endpoint devices associated with the gateway device, and a second interface for enabling bi-directional communications via a wide-area network, for the one or more endpoint devices associated with the gateway device. A processor is coupled to the interfaces and is configured to manage file sharing through presence and networking messaging communication between the one or more endpoint devices associated with the gateway device and at least another endpoint device (associated with the gateway device or not), to access a file to share received from the one or more end-point devices associated with the gateway device or from endpoint devices not associated with the gateway device. The processor selectively makes the accessed file available to the one or more endpoint devices.

39 Claims, 17 Drawing Sheets

U.S. PATENT DOCUMENTS

| | | | |
|---|---|---|---|
| 6,487,646 | B1 | 11/2002 | Adams et al. |
| 6,526,581 | B1 | 2/2003 | Edson |
| 6,681,232 | B1 | 1/2004 | Sistanizadeh et al. |
| 6,735,619 | B1 | 5/2004 | Sawada |
| 6,850,979 | B1 | 2/2005 | Saulpaugh et al. |
| 6,871,193 | B1 | 3/2005 | Campbell |
| 6,898,276 | B1 | 5/2005 | Millet et al. |
| 6,930,598 | B2 | 8/2005 | Weiss |
| 6,957,275 | B1 | 10/2005 | Sekiguchi |
| 6,961,335 | B1 | 11/2005 | Millet et al. |
| 6,965,614 | B1 | 11/2005 | Osterhout et al. |
| 7,035,270 | B2 | 4/2006 | Moore, Jr. et al. |
| 7,075,919 | B1 | 7/2006 | Wendt et al. |
| 7,206,809 | B2 * | 4/2007 | Ludwig et al. ................ 709/204 |
| 7,207,048 | B2 | 4/2007 | McQuillan et al. |
| 7,509,372 | B2 * | 3/2009 | Dutta et al. .................. 709/203 |
| 7,653,689 | B1 * | 1/2010 | Champagne et al. ......... 709/206 |
| 7,668,939 | B2 * | 2/2010 | Encarnacion et al. ........ 709/220 |
| 7,787,863 | B2 * | 8/2010 | van de Groenendaal ..... 455/411 |
| 7,844,549 | B2 * | 11/2010 | Strickland ....................... 705/59 |
| 2002/0023131 | A1 | 2/2002 | Wu et al. |
| 2002/0065894 | A1 | 5/2002 | Dalal et al. |
| 2002/0138576 | A1 * | 9/2002 | Schleicher et al. ........... 709/205 |
| 2002/0176404 | A1 | 11/2002 | Girard |
| 2002/0184358 | A1 | 12/2002 | Traversat et al. |
| 2002/0184620 | A1 | 12/2002 | Davies |
| 2003/0126207 | A1 | 7/2003 | Creamer et al. |
| 2003/0140103 | A1 | 7/2003 | Szeto et al. |
| 2003/0169752 | A1 | 9/2003 | Chen et al. |
| 2003/0210770 | A1 | 11/2003 | Krejcarek |
| 2004/0001480 | A1 | 1/2004 | Tanigawa et al. |
| 2004/0133689 | A1 * | 7/2004 | Vasisht ......................... 709/228 |
| 2004/0255048 | A1 | 12/2004 | Lev Ran et al. |
| 2004/0255326 | A1 | 12/2004 | Hicks, III et al. |
| 2005/0027887 | A1 | 2/2005 | Zimler et al. |
| 2005/0038875 | A1 | 2/2005 | Park |
| 2005/0108091 | A1 | 5/2005 | Sotak et al. |
| 2005/0138193 | A1 * | 6/2005 | Encarnacion et al. ........ 709/230 |
| 2005/0216949 | A1 | 9/2005 | Candelora |
| 2005/0240680 | A1 | 10/2005 | Costa-Requena et al. |
| 2005/0249196 | A1 | 11/2005 | Ansari et al. |
| 2005/0257039 | A1 | 11/2005 | Marshall |
| 2006/0025132 | A1 | 2/2006 | Karaoguz et al. |
| 2006/0031406 | A1 | 2/2006 | Watson et al. |
| 2006/0040667 | A9 | 2/2006 | Coppinger et al. |
| 2006/0080397 | A1 * | 4/2006 | Chene et al. .................. 709/213 |
| 2006/0209857 | A1 | 9/2006 | Hicks, III |
| 2006/0259584 | A1 | 11/2006 | Watson et al. |
| 2006/0291506 | A1 | 12/2006 | Cain |
| 2007/0100981 | A1 | 5/2007 | Adamczyk et al. |
| 2007/0198685 | A1 * | 8/2007 | Phatak ........................... 709/223 |
| 2009/0221307 | A1 * | 9/2009 | Wolak et al. ................... 455/466 |
| 2010/0235432 | A1 * | 9/2010 | Trojer ............................ 709/203 |

OTHER PUBLICATIONS

Intel, "Delivering on the Promise of Triple Play Digital Media," Technology Backgrounder, Consumer Electronics, 2004, pp. 1-4.

Yeon-Joo, Oh, et al. "Design of a SIP-based Real-time Visitor Conversation and Door Control Architecture using a Home Gateway." Consumer Electronics, 2006. ICCE '06. 2006 Digest of Technical Papers, International Conference, Las Vegas, NV, USA, IEEE, Jan. 7, 2006, pp. 187-188.

Ganguly, Arjit, et al. "IP over P2P: enabling self-configuring virtual IP networks for grid computing." In Parallel and Distributed Processing Symposium, 2006, IPDPS Apr. 25-29, 2006, retrieved on Jan. 20, 2010. Retrieved from the Internet: <URL:http://aarxiv.org/PS_cache/cs/pdf/0603/0603087v1.pdf.>.

PCT International Searching Authority—European Patent Office, PCT Written Opinion of the International Searching Authority mailed Oct. 30, 2008, International Application No. PCT/US2007/089237, filed Dec. 31, 2007, 15 pages.

PCT International Searching Authority—European Patent Office, PCT International Search Report mailed Aug. 27, 2008, International Application No. PCT/US2007/089237, filed Dec. 31, 2007, 6 pages.

PCT International Searching Authority—European Patent Office, PCT Written Opinion of the International Searching Authority mailed Jul. 17, 2008, International Application No. PCT/US2007/019543, filed Sep. 7, 2007, 5 pages.

PCT International Searching Authority—European Patent Office, PCT International Search Report mailed Jul. 17, 2008, International Application No. PCT/US2007/019543, filed Sep. 7, 2007, 1 page.

PCT International Searching Authority—European Patent Office, PCT Written Opinion of the International Searching Authority mailed Jul. 14, 2008, International Application No. PCT/US2007/019546, filed Sep. 7, 2007, 5 pages.

PCT International Searching Authority—European Patent Office, PCT International Search Report mailed Jul. 14, 2008, International Application No. PCT/US2007/019546, filed Sep. 7, 2007, 1 page.

PCT International Searching Authority—European Patent Office, PCT Written Opinion of the International Searching Authority mailed Apr. 25, 2008, International Application No. PCT/US2007/019531, filed Sep. 7, 2007, 7 pages.

PCT International Searching Authority—European Patent Office, PCT International Search Report mailed Apr. 25, 2008, International Application No. PCT/US2007/019531, filed Sep. 7, 2007, 1 page.

PCT International Searching Authority—European Patent Office, PCT Written Opinion of the International Searching Authority mailed Aug. 21, 2008, International Application No. PCT/US2007/019534, filed Sep. 7, 2007, 5 pages.

PCT International Searching Authority—European Patent Office, PCT International Search Report mailed Aug. 21, 2008, International Application No. PCT/US2007/019534, filed Sep. 7, 2007, 1 page.

PCT International Searching Authority—European Patent Office, PCT Written Opinion of the International Searching Authority mailed Aug. 25, 2008, International Application No. PCT/US2007/019545, filed Sep. 7, 2007, 5 pages.

PCT International Searching Authority—European Patent Office, PCT International Search Report mailed Aug. 25, 2008, International Application No. PCT/US2007/019545, filed Sep. 7, 2007, 1 page.

PCT International Searching Authority—European Patent Office, PCT Written Opinion of the International Searching Authority mailed Jul. 2, 2008, International Application No. PCT/US2007/019544, filed Sep. 7, 2007, 5 pages.

PCT International Searching Authority—European Patent Office, PCT International Search Report mailed Jul. 2, 2008, International Application No. PCT/US2007/019544, filed Sep. 7, 2007, 1 page.

PCT International Searching Authority—European Patent Office, PCT Written Opinion of the International Searching Authority mailed Mar. 14, 2008, International Application No. PCT/US2007/019533, filed Sep. 7, 2007, 7 pages.

PCT International Searching Authority—European Patent Office, PCT International Search Report mailed Mar. 14, 2008, International Application No. PCT/US2007/019533, filed Sep. 7, 2007, 1 page.

* cited by examiner

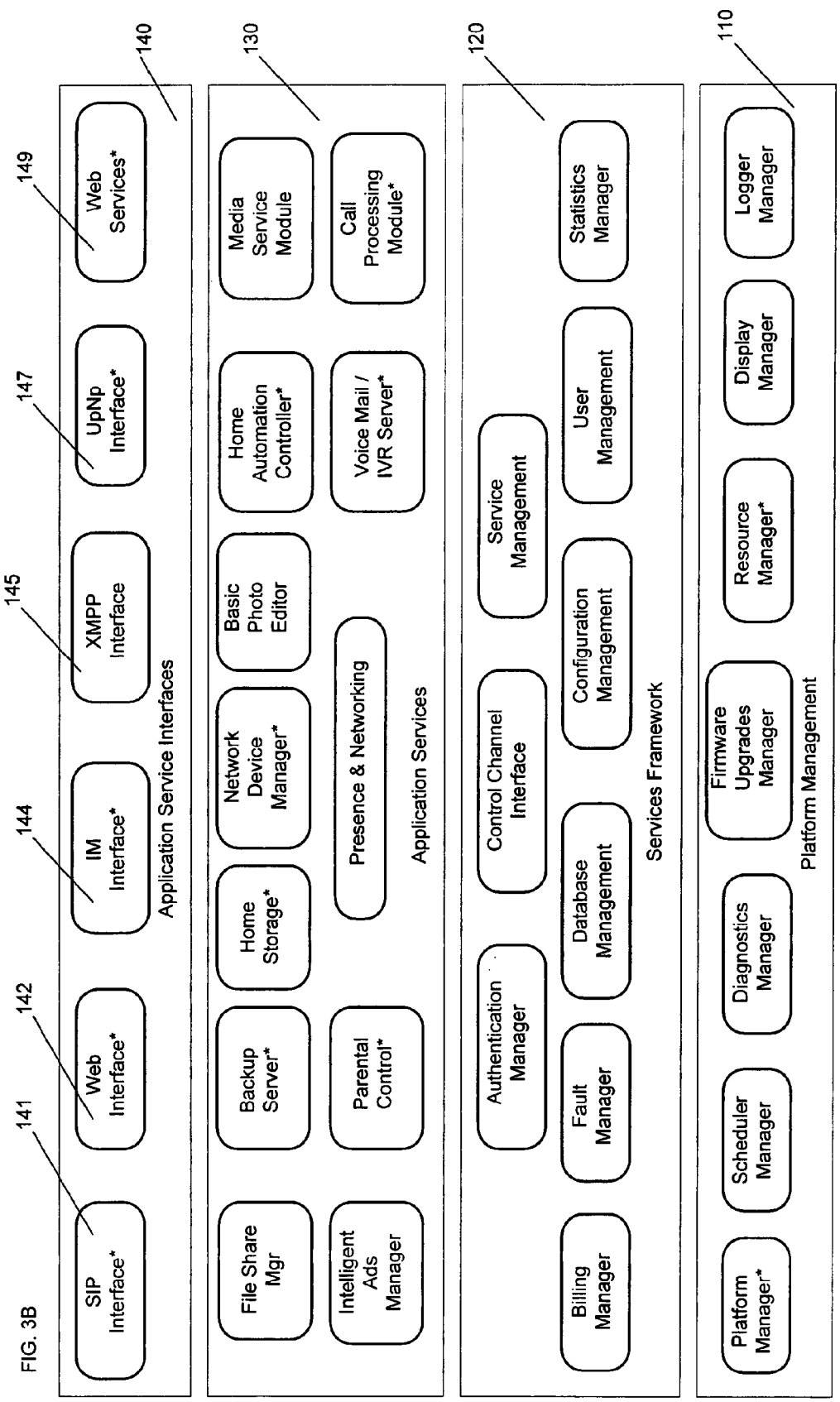

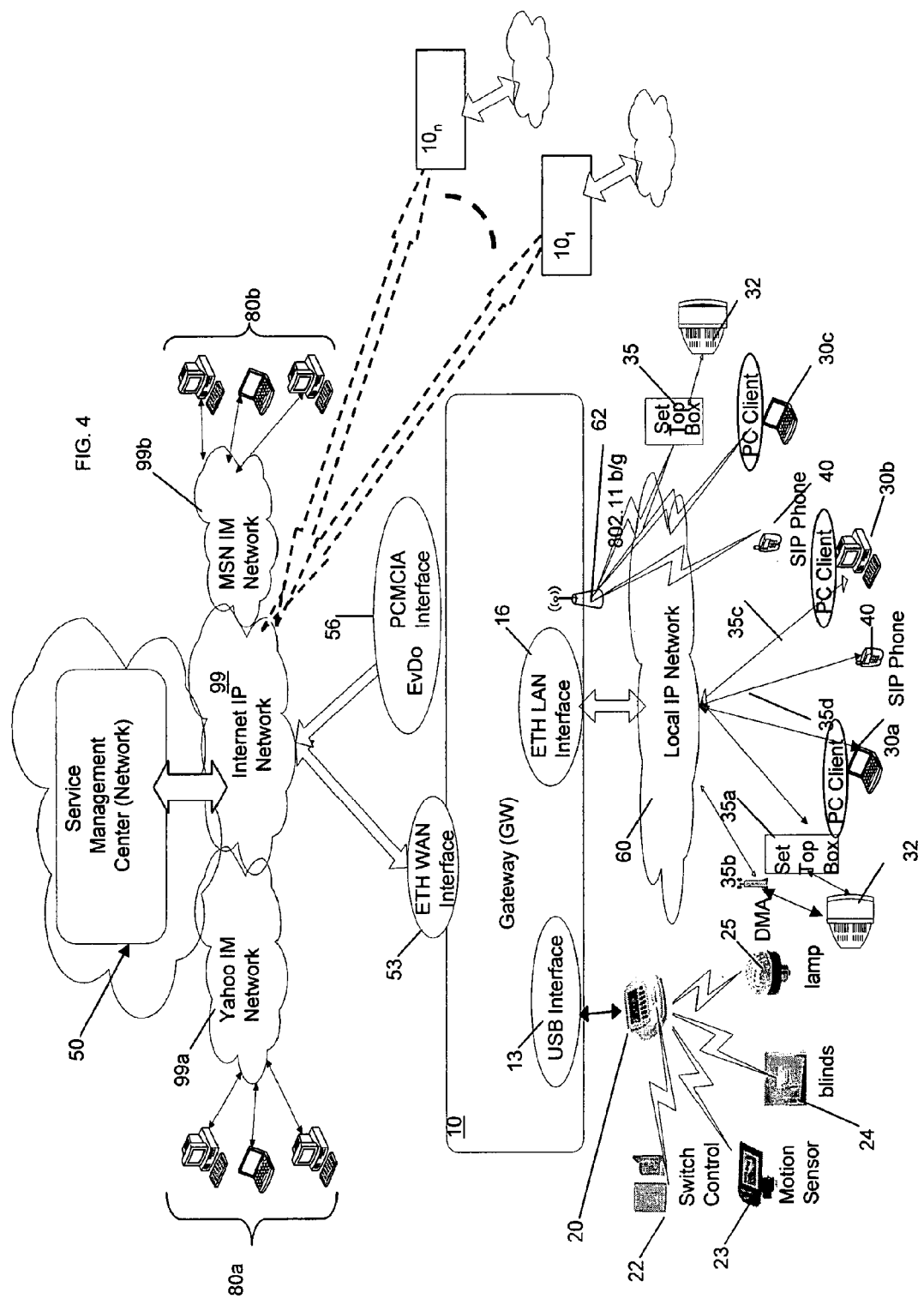

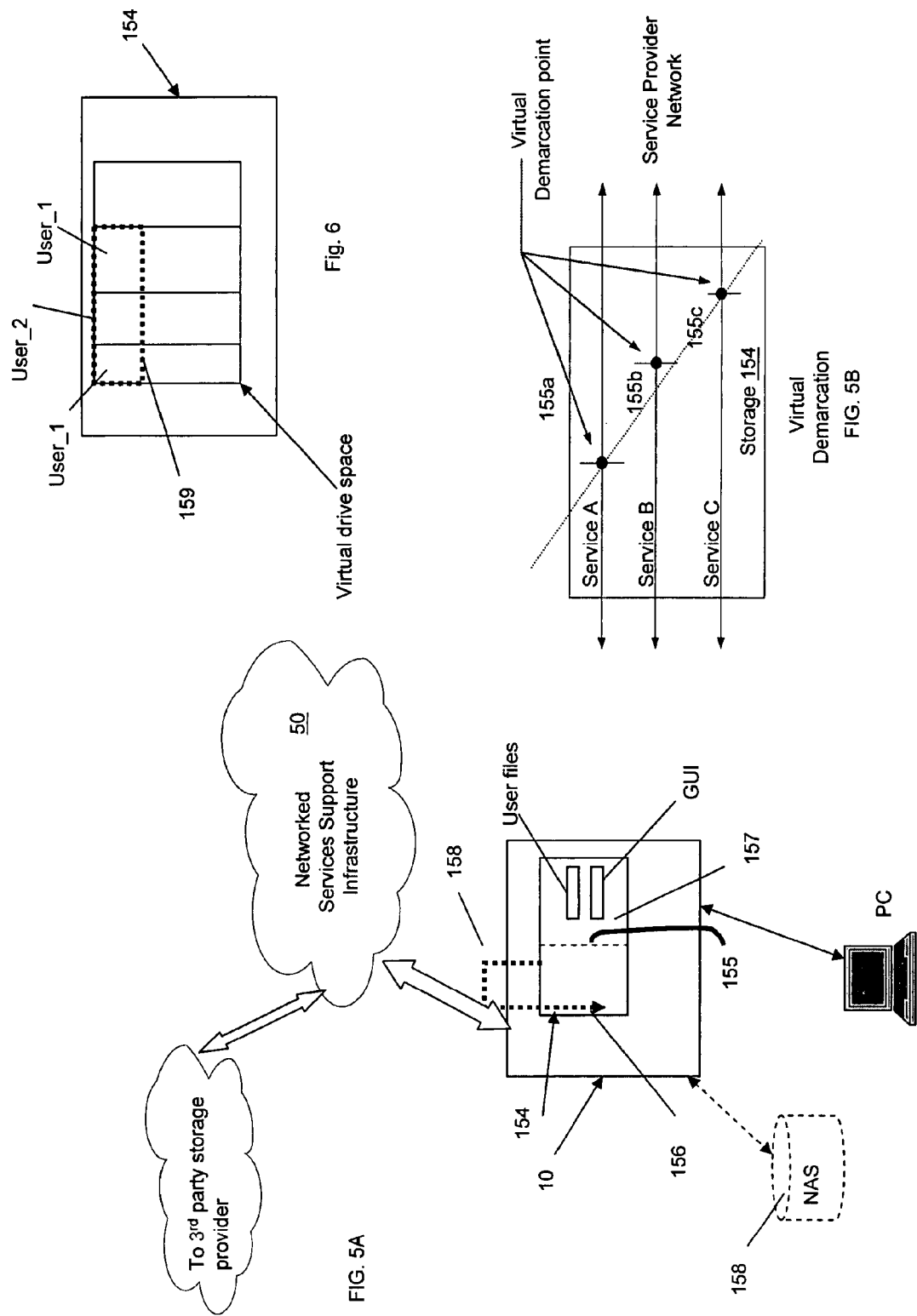

FILE SHARING THROUGH MULTI-SERVICES GATEWAY DEVICE AT USER PREMISES

CROSS REFERENCE

This application is a U.S. national phase application of co-pending international application Number PCT/US2007/019531 filed Sep. 7, 2007, which claims the benefit of U.S. provisional application No. 60/882,865 filed Dec. 29, 2006 and U.S. provisional application No. 60/882,862 filed Dec. 29, 2006, the disclosures of which is incorporated herein by reference.

TECHNICAL FIELD

The present subject matter relates to gateway devices and systems, and/or programming for such devices and systems, for managing file sharing services for associated endpoint devices.

BACKGROUND ART

The digital home is now becoming more complex with the myriad of new and emerging digital devices intended to address many user and consumer needs such as communication, entertainment, privacy and security, etc. However, given the complexity of the emerging digital home and digital environments generally, users who are technologically challenged may find it a daunting and intimidating task to manage their home networks and interconnected digital devices. Moreover, new paradigms are emerging oriented to delivering media content to and the consuming of media content at the home. Many of these paradigms rely on communication of application specific data to and/or from the Internet, as opposed to conventional telephone or broadcast video type applications. The protection of received Internet-sourced media content in addition to user-generated media content is additionally an important aspect that may be inadequately addressed by the technologically challenged user. Furthermore, with respect to Internet based data, most of the content delivery solutions are provided to the digital home networks through availability of the "two-foot" interface (i.e. the PC). It is relatively cumbersome to bring this content to the "ten-foot" interface (e.g. the television).

Thus, a need exists for a technique or devices to simplify the overall management of services and applications available to the digital home or even the small enterprise. Such a technique or devices would reduce the complexity of the maintenance, upgrading, and operation of even the more basic needs addressed by emerging digital endpoint devices and networks. Approaches that suggest greater functionality in home-based appliances fail to reduce or address the complexity of managing and provisioning those appliances. For example, while the home gateway server appliance described in U.S. Pat. No. 6,930,598 enables networked electronic devices to communicate with each other without the direct interaction with external networks, and provides a mechanism whereby a member of the household may be informed of certain network related events without having to use their home computer or other client devices, it does not provide a convenient or simplified way of managing the services and applications executed by, or associated with, that device. Thus, an unmet need exists for a device associated with a user premises that has robust functionality but does not require sophisticated or inordinate attention from the user to manage, provision and utilize them.

In practice, a customer typically subscribes to basic transport services from a network "Service Provider" (e.g. ISP—Internet Service Provider, cable provider, fixed wireless providers, ILEC—Incumbent Local Exchange Carrier, or CLEC—Competitive Local Exchange Carrier). For example, a customer may have broadband Internet access, via cable modem, digital subscriber line service or the like. Digital video service may be provided separately. The network service provider manages these basic services, at the logical network layer, typically at layers 1, 2 or 3 of the OSI model. While network services and associated devices may operate minimally at those levels, they operate at those levels only to support operations at OSI layers 1, 2 or 3. Many applications, however, involve higher level service logic for applications that view the network transport as a transparent pipe. The current interne applications delivery and management architecture, and many devices or management systems based on it, require a server with robust processing and storage capability to be located at the network operations center, not in the home. For voice over interne protocol (VoIP) type telephone service, for example, the VoIP service provider operates a session initiation protocol (SIP) server or the like, and each user has only client functionality. The network transport layers are transparent to the IP packets containing the voice and related signaling. The SIP server, however, controls the call set-up, tear-down, billing and the like for the voice call services. With such an architecture, the major capabilities and functionalities connected with providing application services from the server throughout the network reside on the server and supporting elements, all of which are located in the network operations center.

It might be helpful to walk through examples of the configuration for application services delivery to a client of an application within a user premises under the typical, current network configuration. FIG. 13 depicts one possible configuration for a client application to access a particular service that is being hosted or served outside of the user premises based on the typical, and currently employed, network application service configuration. We identify two regimes in the overall architecture, the Service Provider Network regime (WAN side), and the User Premises Network regime (LAN side). The association between the Service Provider Network and the User Premises Network is broken down into three layers; Network Interconnect Layer (NI), Network Function Layer (NF), and the Application Services Layer (AS). These layers do not represent physical communication pathways, but are a logical representation of pathways and elements employed in a network-based communication.

The separation between the managed Service Provider Network (WAN side) and the User Premises Network (LAN side) is depicted as the Network Service Provider Demarcation. The Network Service Provider Demarcation at the Network Interconnect Layer represents the logical and physical separation between the user premises and the broad-band network. In the present representation of the three functional layers, the Network Service Provider Demarcation is extended into the Services and Application Layer to emphasize the functional barrier at that layer between the Service Provider Network and the User Premises Network, in currently configured networks.

The NI Layer depicts how the connectivity between a User Premises Network and the Public/Service Provider Network is established. On the Service Provider Network side, the Wide Area Network services are terminated onto a WAN termination device with the appropriate interface (e.g. a Broadband internet service such as ADSL would terminate on to a managed ADSL Terminal Adapter). The WAN termination layer adapts the WAN interface into a compatible LAN interface (e.g. Ethernet or WiFi). On the User Premises Network side the LAN Termination interfaces are used to connect to the Local Area Network via a variety of interfaces, such as Ethernet, WiFi, MOCA, etc.

The LAN Termination interfaces and the WAN Termination interface could reside on two separate physical devices or they could reside on one physical device. In either case, on the User Premises Network side, packets or data must flow through the NF Layer between the WAN Termination Interface and the LAN Termination Interface. One or both of these interfaces may reside on a "gateway" device. Gateway and like router devices are currently available for various premises that allow several computers to communicate with one another and to share a broadband Internet connection. These devices function as routers by matching local network addresses and the hostnames of the local computers with the actual networking hardware detected. As gateways, these devices translate local network addresses to those used by the Internet for outgoing communications, and do the opposite translation for incoming packets.

The User Premises NF Layer allows for switching of packets between LAN devices and routing or bridging of packets between the LAN and WAN interfaces. It could physically reside on the same device(s) with the LAN Termination or it could exist at an independent device that could interconnect to the LAN Termination interface via a variety of physical interfaces (e.g. Ethernet, MOCA, etc.). The Service Provider NF Layer provides the Wide Area Network access between the WAN Termination device and the AS Layer where all the applications servers are being hosted. The Internet could be used for this connectivity as could a private packet/cell network (e.g. Cellular packet network, or a private ATM or packet backbone).

The AS Layer represents the functional layer that provides access to applications services by application clients. On the User Premises side, the AS Layer provides a Firewall to protect the application client from application level attacks from the open Internet. On the Service Provider side, the AS Layer encompasses application services such as Parental Control, Backup, and Call Processing. These application services exist on a managed Application Service Delivery Platform (ASD) on a secure network server that can be hosted at a facility that has private and/or public data connection paths. The ASD may include three functional modules, namely the Application Service Enforcement (ASE) module, the Application Service Logic (ASL) module, and the Application Service Management (ASM) module.

The ASE module is responsible for enforcing the relevant Application Client privileges to the application services. It gets the policies and permissions of each application client from the ASM module (such as provisioning data and subscription data) and enforces those policies against the requested actions by the client application.

The ASL module executes the application services that the Application Clients request. Such services could be Call Processing, Parental Control, Peered Networking, Backup, etc. The ASL module must interact with the ASM module for monitoring purposes and status information such as Call Data Recording and Billing. It must also interact with the ASE module to provide access to the client applications that have passed the policy enforcement procedures.

The ASM module, as described above, provides the necessary data to the ASE and ASL modules for them to carry out their respective functions. It also oversees the overall integration and communication among all the modules and the services that are managed by the ASM. The ASM also manages the overall security and integrity of the ASD.

All ASD modules are in constant communication with each other, preferably through secure connections. The inter-module communication may be managed by the ASM, or may be independent of a central management function. Note that the ASE, ASL and ASM modules are only examples of functions that may be logically bundled; other bundles, and other means of bundling these functions, are possible.

FIG. 14 depicts a logical flow of how a specific Application Client residing at a user premises could interact with an Application Service that is being managed in the typical network configuration. Traditionally, as depicted in this example, an Application Client (e.g. Telephony) that needs to connect to an Application Service (e.g. call processing) must first connect to the Local Are Network termination interface (1). Depending on the specific deployment, a switching function, routing function or bridging function is used to establish the connection path between the application client (2) and the Firewall service (3). The Firewall Service works in conjunction with the router function (4) to permit access to the Wide Area Network interface (5) and maintain a level of security to the Application Client. The firewall service in this example is not aware of either the type of application client or the specific application service that is being targeted. There is no feedback mechanism between the Application Service Delivery Platform and the Firewall function. Once connectivity to the WAN termination interface is established, routing mechanisms are used to establish a connection through the Service Provider Network Function Layer (6) to the Application Service Layer (7). At the Application Service Layer, the client application goes through application validation procedures and privilege and permission checks by the ASE prior to allowing the application client to connect to the desired application service.

In the logical hierarchy, such as shown in FIGS. 13 and 14, a home gateway device may implement the NI layer functions and the user premises side NF layer functions. The firewall functionality may reside in the gateway or in one or more other elements on the premises network. For example, many PCs internally implement firewalls, e.g. in close association with the client programming of the endpoint device. As can be seen by the illustrations in FIGS. 13, 14 however, even with a home gateway deployment for a premises network, the application services functionality still requires the support and service logic to reside on a server in the network. That is, for service provisioning, service management and upgrades, remote diagnostics, for a digital endpoint device such as a PC or SIP phone, the home premises still must rely on the application service logic executed by the service providers in their server networks, typically according to proprietary platforms. Moreover, many other core services, e.g. file storage, media content access and delivery, are offloaded to other 3rd-party service providers that provide service logic and support applications at their network server devices.

With the paradigm discussed above relative to FIGS. 13 and 14, it is currently the case that many of the application service providers also find it difficult to provide and support new emerging technologies at the home. That is, service providers are challenged to select a platform that can evolve with their applications. With existing service architectures, the launch of new services compounds complexity to the core network, adding to both capital and operating expenditures.

Thus, as new services come to the fold, often with the requirement of new equipment, e.g. integrated access devices (IADs) for VoIP and set-top boxes for streaming video, the management of the customer premises equipment (both hardware and software) complicates customer support requirements. Managing the home network environment can be an inhibitor to the adoption of new services, both from the user perspective and from the perspective of management by the service providers.

In the digital age, there is much information that people want to share with other people, including pictures, lists, music, etc. File sharing has typically been achieved through a conventional file server architecture. Hence, a user that wants to share a picture file with his grandmother will send an email from his PC with that picture file attached to the grandmother's email account over the internet. This approach is relatively cumbersome, as authorization is generally checked at a central location, and does not readily accommodate communication with multiple endpoint devices, such as phones, televisions, digital picture frames. Such endpoint devices are an important part of the fabric of everyday life, and the way people communicate, so that sharing files to and from these endpoint devices is ever more desirable.

A need exists for a new paradigm to achieve a file sharing system and method, with improved convenience for the user and easier management for the application service provider. In that regard, it would be desirable to provide a multi-services application gateway device and system that manages file sharing for one or more endpoint devices associated with the gateway device.

SUMMARY

The technology discussed herein may be embodied in gateway devices, typically for deployment at user premises, and/or to programming for devices that may function as such gateways. Such a gateway device is for operation at a user premises to provide and manage services of one or more endpoint devices associated with the gateway device. The gateway device comprises a first interface for enabling bi-directional communications with one or more of the endpoint devices associated with the gateway device, a second interface for enabling bi-directional communications via a wide-area network, for the one or more endpoint devices associated with the gateway device, and a processor coupled to the interfaces. The processor is configured to manage file sharing through presence and networking messaging communication between the one or more endpoint devices associated with the gateway device and at least another endpoint device either associated with the gateway device or not associated with the gateway device, to access a file to share received from the one or more endpoint devices associated with the gateway device or from one or more endpoint devices not associated with the gateway device, and to selectively make the accessed file available for sharing with the one or more endpoint devices.

Also disclosed are methods of sharing files between endpoint user devices, at least one of which is associated with a gateway device at a user premises. The method comprises the steps of determining that an endpoint device associated with the gateway device at the user premises or an endpoint device not associated with the gateway device has a file to share with at least one other endpoint device, determining the identity of the at least one other endpoint device, and managing with the gateway device the sharing of the file with the at least one other endpoint device based on the determined identity of the at least one other endpoint device.

Application service programming is logically positioned on a user premises side of a first logical network demarcation, forming an edge of the wide area network at the user premises. The programming also defines a logical service provider-user demarcation between the user premises and the application service provider. The application service programming resides on the service provider side of this second demarcation and only provides a logical application service interface across that demarcation to deliver an application service to an endpoint device. The logical service provider-user demarcation also provides a demarcation in accessibility to hardware resources of the gateway device, whereby some hardware resources of the gateway device are on the service provider side of the logical service provider-user demarcation and are inaccessible to an endpoint device from the user side of that demarcation.

The disclosed architecture allows a user to establish buddy lists with which to controllably share digital files and to establish their own communities. This can be done with presence and networking messaging, through the use of XMPP, for example, as managed by the gateway device at the premises. Hence, all of the devices associated with a gateway device at a premises can share files with other devices according to buddy lists maintained by the gateway device. These other devices can be either associated with the gateway device at the premises (i.e., all in the same household), and/or associated with remote gateway devices. Even for those devices associated with a gateway device at a premises, the devices do not have to be physically within the premises, but merely need to be able to communicate with the gateway device of the premises. This allows a grocery list generated by a person in the home to be generated at home and provided to an associated endpoint user device, such as a mobile phone or PDA, to a spouse returning home from work.

The disclosed systems and methods do not require that each endpoint user device maintain its own buddy list in its own memory. This centralization of buddy lists allows the buddy list concept to be extended to other devices beyond mobile phones and other presence and networking devices, which have employed buddy lists in the past. For example, when a user adds picture files to a picture folder, a centralized buddy list may be employed to send the picture files to all of the buddies on the list.

The disclosed system and methods allow file sharing features to be employed with devices not conventionally employed in file sharing situations, such as televisions and digital picture frames. As an example, a digital picture frame or a television at a grandmother's house can be one of the buddies on a buddy list. When a picture file is added that is to be shared to the buddies on the list, the picture file is sent, independently of a file server, to the grandmother's picture frame. The notification to the grandmother can be by any of a different number of pre-configured and settable manners, such as a notification on her television screen, or a telephone notification. In certain embodiments, there is no notification at all to the grandmother, so that the picture will just appear for her on her digital picture frame.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

The drawing figures depict one or more implementations in accord with the present teachings, by way of example only, not by way of limitation. In the figures, like reference numerals refer to the same or similar elements.

FIGS. 3A to 3C depict the software and hardware architectures of the multi-services applications gateway device.

FIG. 4 is a network diagram, depicting a gateway device, endpoint devices at the user premises, one or more wide area networks and a service management center.

FIGS. 5A and 5B conceptually depict the demarcation in a storage media that provides isolation of downloaded service logic and associated data for implementing services from service provider and/or downloaded content, from a user generated content.

FIG. 6 conceptually depicts a virtual hosting (space-sharing) service provided by the gateway device.

Figure 7:
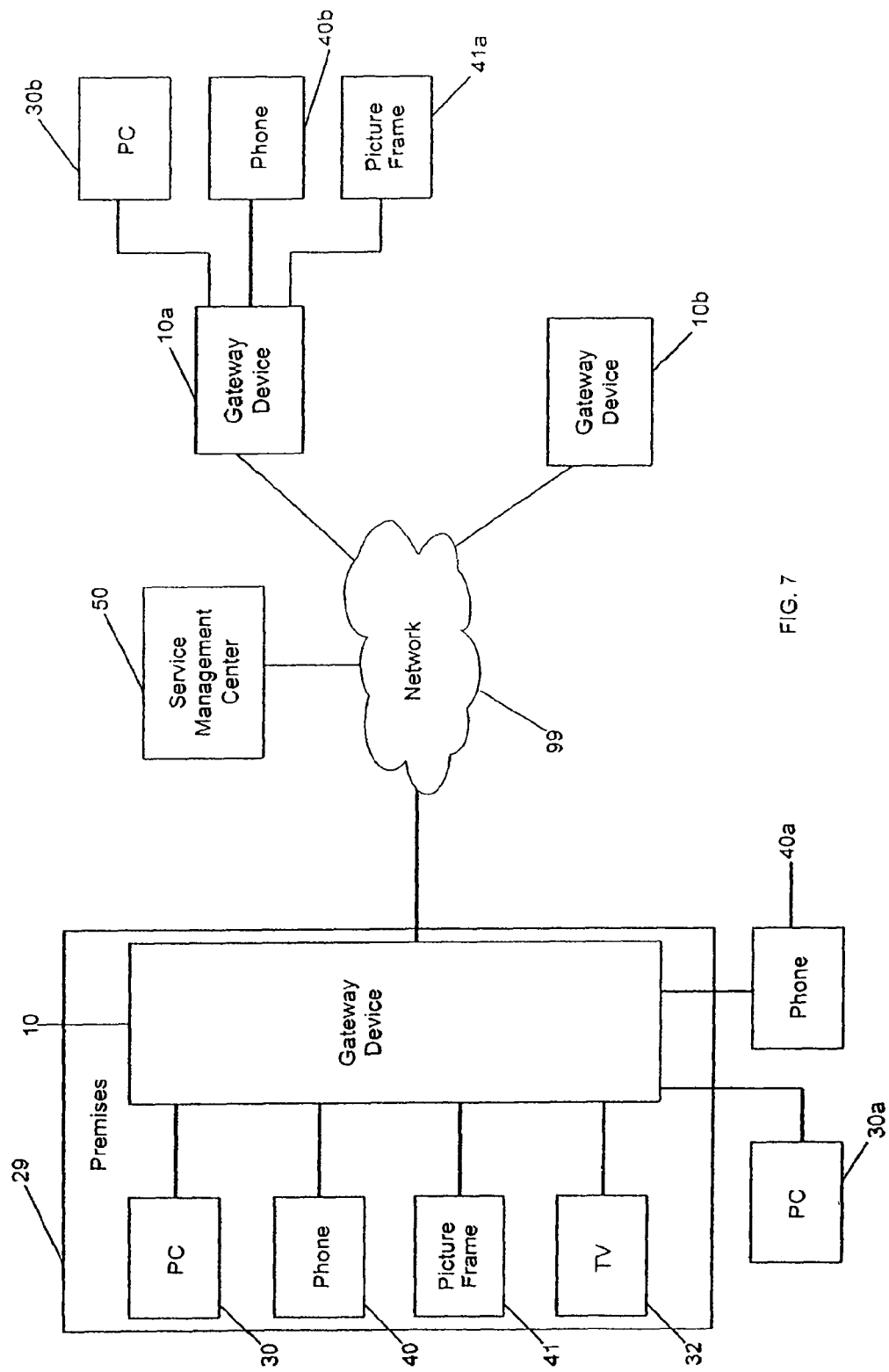

FIG. 7 is a schematic depiction of a system that performs file sharing.

FIGS. 8-12 are process flow diagrams, illustrating operations for providing file sharing services.

Figure 13:
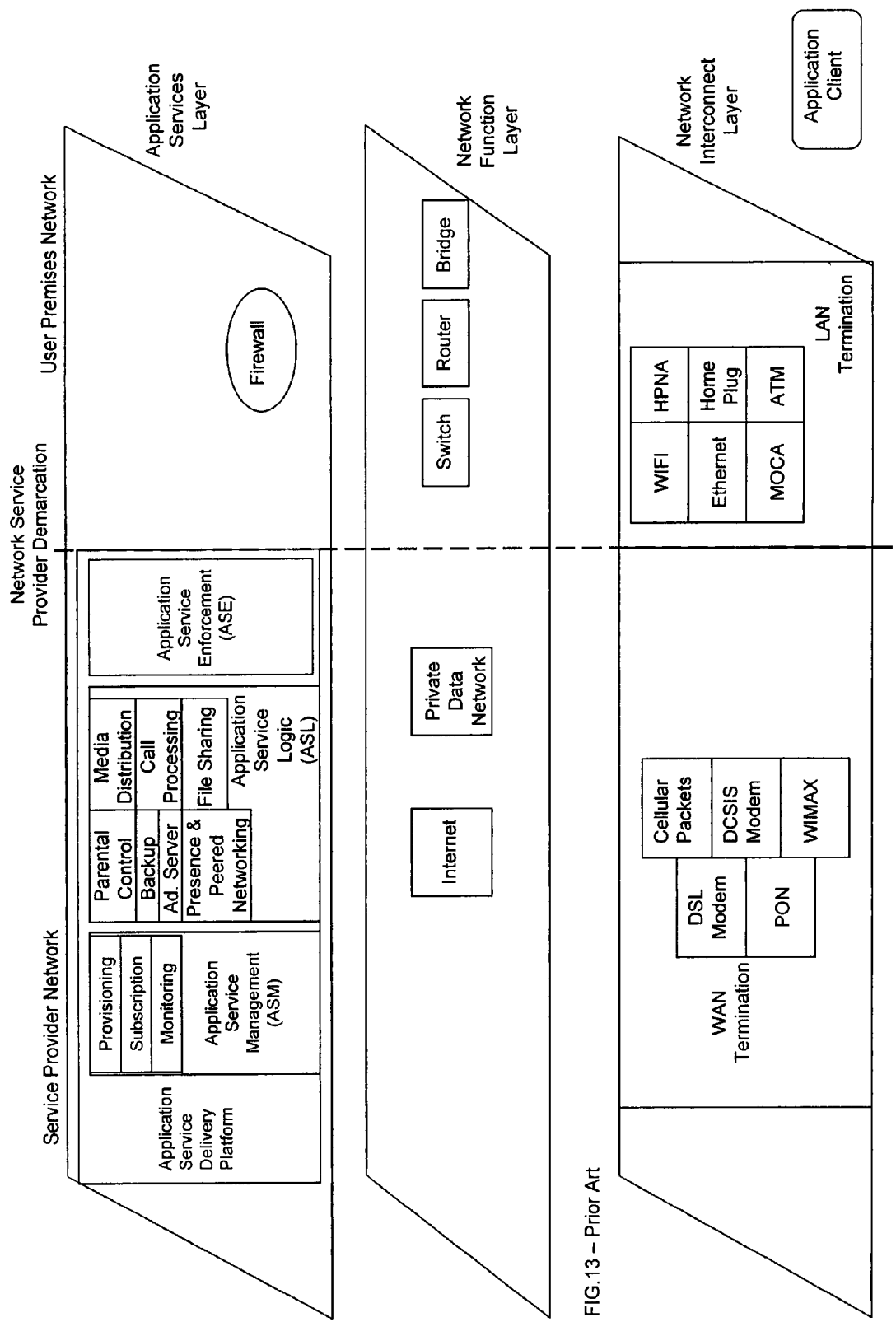

FIG. 13 is a layered logical block diagram of one possible configuration for service delivery to a client of an application within a user. premises based on a typical current network architecture.

Figure 14:
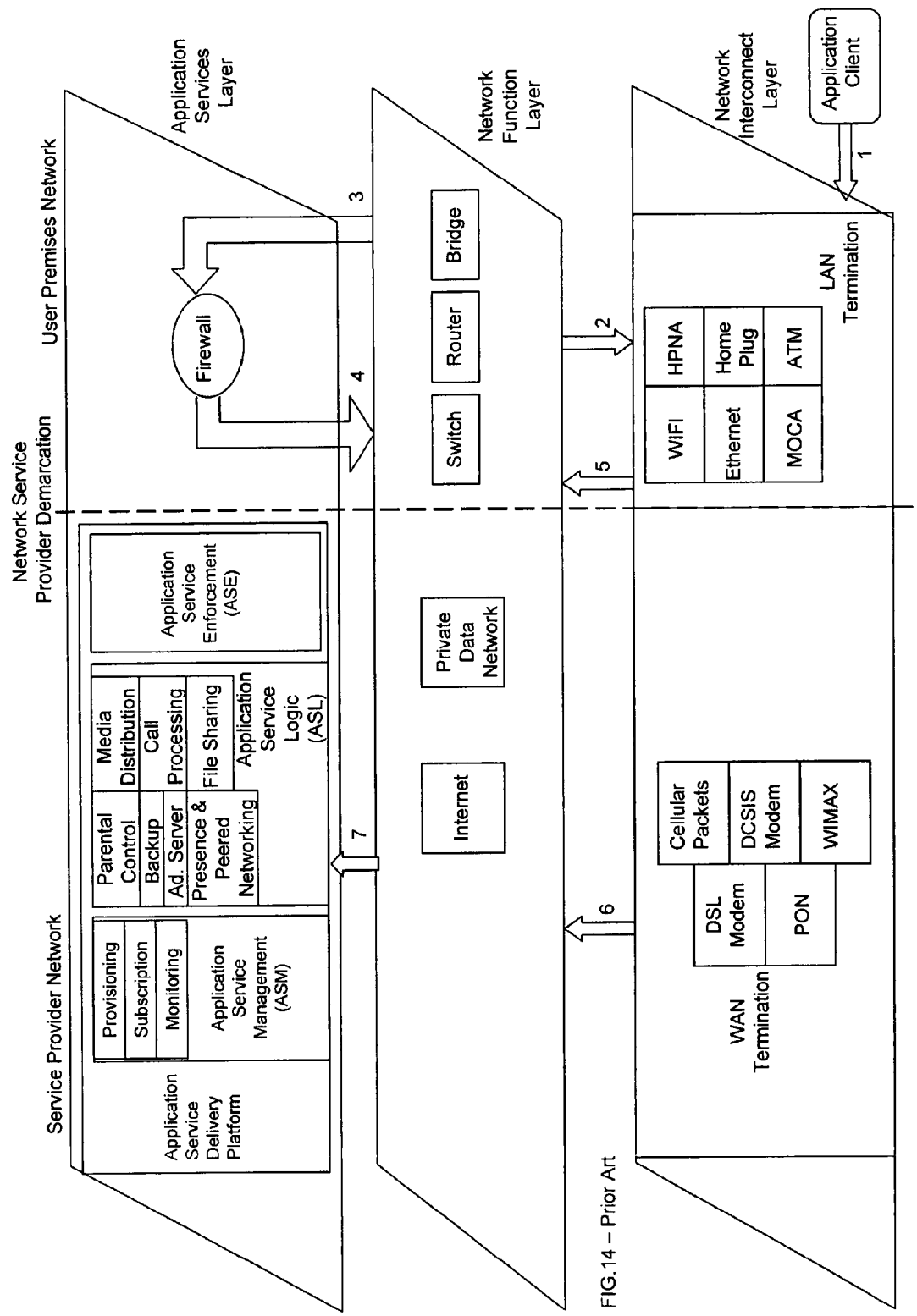

FIG. 14 is similar to FIG. 13, but overlaid with arrows to show a sample flow of logical steps taken by an Application Client to access a specific managed Application Services in the typical current network configuration.

Figure 15:
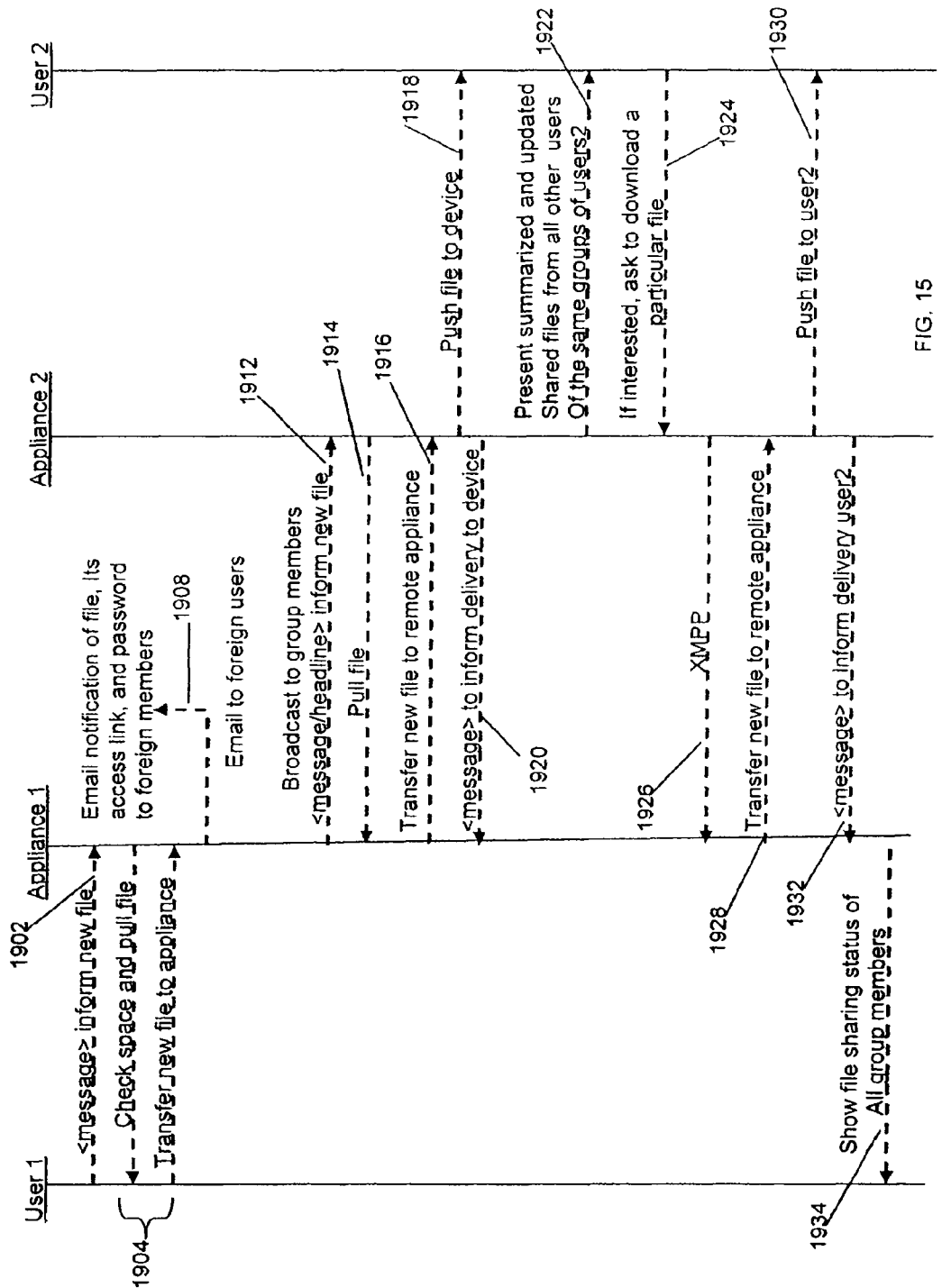

FIG. 15 illustrates exemplary processing performed during file sharing in certain embodiments.

Figure 16:
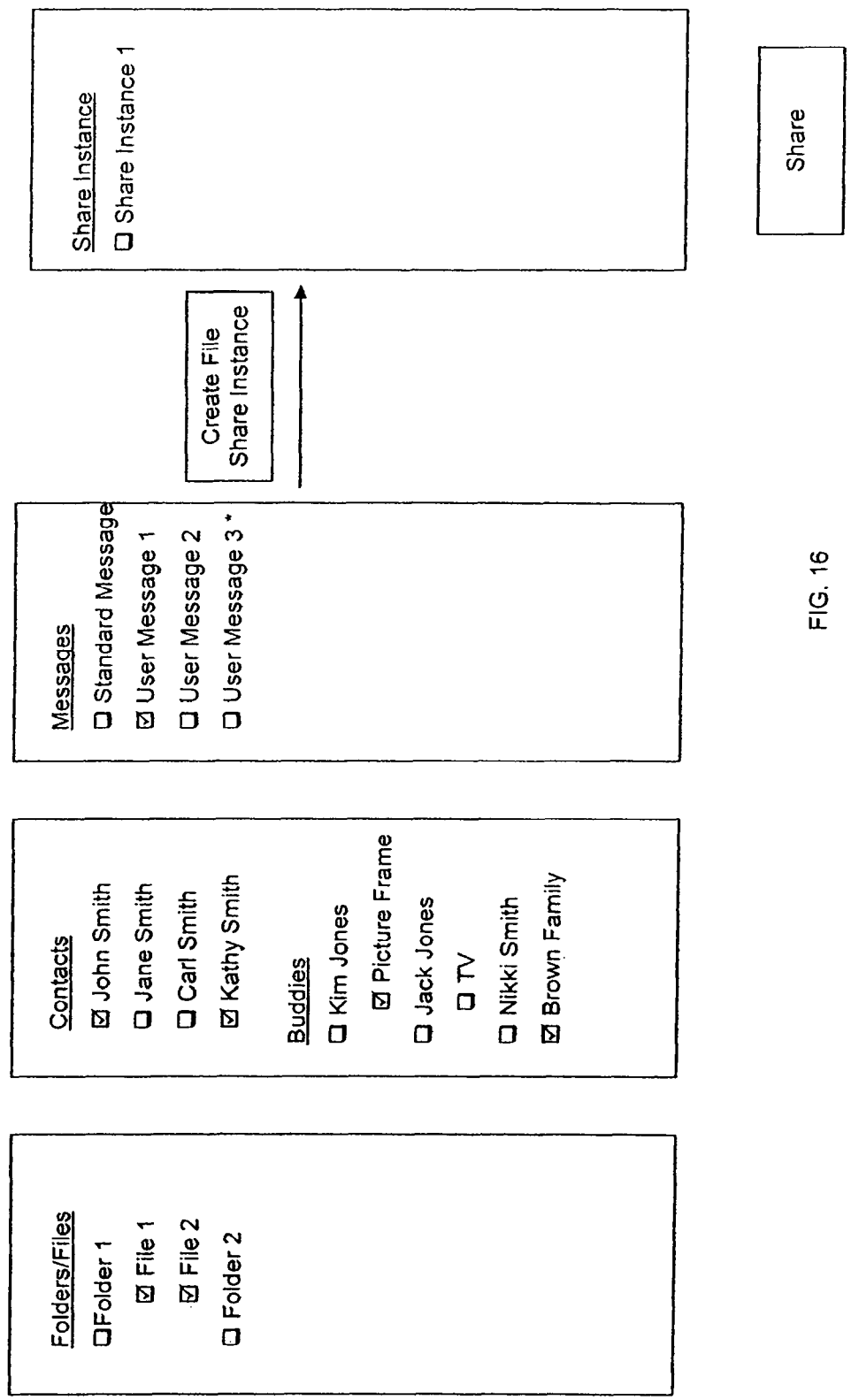

FIG. 16 is an exemplary embodiment of a user window for a file share instance.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

An architecture and methods are described that provide for file sharing. The architecture, described in detail below, provides a digital management appliance that, once configured, arranges for and manages the sharing of files within a defined group of devices that are located either inside or outside a home. The sharing can be through presence and networking messaging and be done independently of a file server. To these ends, a gateway device is provided for operation at a user premises to provide and manage services of one or more endpoint devices associated with the gateway device. The gateway device comprises a first interface for enabling bi-directional communications with one or more of the endpoint devices associated with the gateway device, a second interface for enabling bi-directional communications via a wide-area network, for the one or more endpoint devices associated with the gateway device, and a processor coupled to the interfaces. The processor is configured to manage file sharing through presence and networking messaging communication between the one or more endpoint devices associated with the gateway device and at least another endpoint device either associated with the gateway device or not associated with the gateway device, to access a file to share received from the one or more endpoint devices associated with the gateway device or from one or more endpoint devices not associated with the gateway device, and to selectively make the stored file to share available to the one or more endpoint devices.

The term "file sharing" is defined as to include at least a number of different ways of distributing information. This includes: copying of files from device to device; a complete transfer of files from device to device, with the sending device not retaining the shared files; providing access to files resident on endpoint devices (including gateway devices), distributed storage and centralized storage; and the presentation of files on a device, without the device storing the shared file locally at the device. Other types of file sharing known to those of ordinary skill in the art are also included in the definition of file sharing.

The following describes in detail an exemplary architecture that can be used to provide the file sharing system and methodologies discussed later, although it should be understood that such embodiments are exemplary only. The various technologies disclosed herein move application service logic, formerly resident in a network node, into a gateway device in the customer premises. The gateway device is implemented in such a manner as to offer its user many of the applications services, such as were previously offered from network-side servers, from the user premises. A logical Network Service Provider Demarcation is formed at the edge of the wide area network at the user premises, that is to say between the wide area network and the equipment in the user premises. The application service logic resides on the user premises side of this first demarcation. The gateway device programming also defines a logical service provider-user demarcation between the user premises and the application service provider, referred to in later examples as the Applications Service Provider Demarcation. The application service programming resides on the service provider side of this second demarcation and can be controlled or managed by the application service provider, typically by communications through the wide area network. The user's access to the programming and resources between the two demarcations is limited. The application service programming only provides a logical application service interface across the Applications Service Provider Demarcation, for delivery of one or more application services to an endpoint device. The Applications Service Provider Demarcation also provides a demarcation in accessibility to hardware resources of the gateway device, whereby some hardware resources of the gateway device are on the service provider side of the logical service provider-user demarcation and are inaccessible to an endpoint device from the user side of that demarcation.

In a typical scenario, a network service provider takes responsibility for managing resources on the network side of the Network Service Provider Demarcation, leaving the user to manage everything on the premises side of that first demarcation. However, in the gateway devices discussed below, an application service provider takes responsibility and controls/manages the software and hardware resources between the two demarcations. This approach provides the application service provider with management control over resources in the premises that deliver that providers' higher layer services, and the application service provider can relieve the end user of many of the burdens of managing customer premises resources.

Examples of application services include one or more of: media delivery, content management, access control and use tracking, file sharing, and protection and back-up services of both Internet/Web-generated digital media content and user generated digital media content. The disclosed gateway device thus is configured and programmed to simplify various aspects of managing the emerging home/business digital networks including the myriad of interconnected digital endpoint devices associated with the gateway device. The endpoint devices need not reside within, or be located at, the premises to maintain their association with the gateway device. For many of the exemplary application services, the application service programming between the demarcations in the gateway device implement server functionality for interactive communication with client functionality of the endpoint devices. Application service functionality of the gateway device, as provided by this client-server interaction, is enabled/disabled and configured by the application service provider, via communications between the gateway device and a service management center via the wide area network.

In this way, the gateway device and service management center move substantial functions performed by the typical network server into the user premises by incorporating those functions between the two demarcations at the gateway device, but in a way that allows for the server functionality to be externally managed by the service management center from the network side, which may be operated by a third-party service provider. In this exemplary architecture, both the server functionality and the application services offered via the gateway device may be managed by the service management center. Moreover, the server function residing in the gateway device is not only located in the premises but it now resides logically on the premises side of the Network Service Provider Demarcation and on the service provider side of the Applications Service Provider Demarcation. In the detailed examples, the gateway device and system architecture place a set of application services on a tightly coupled (e.g. always-on or always-available basis), secure hardware platform that is externally managed.

Figure 1:
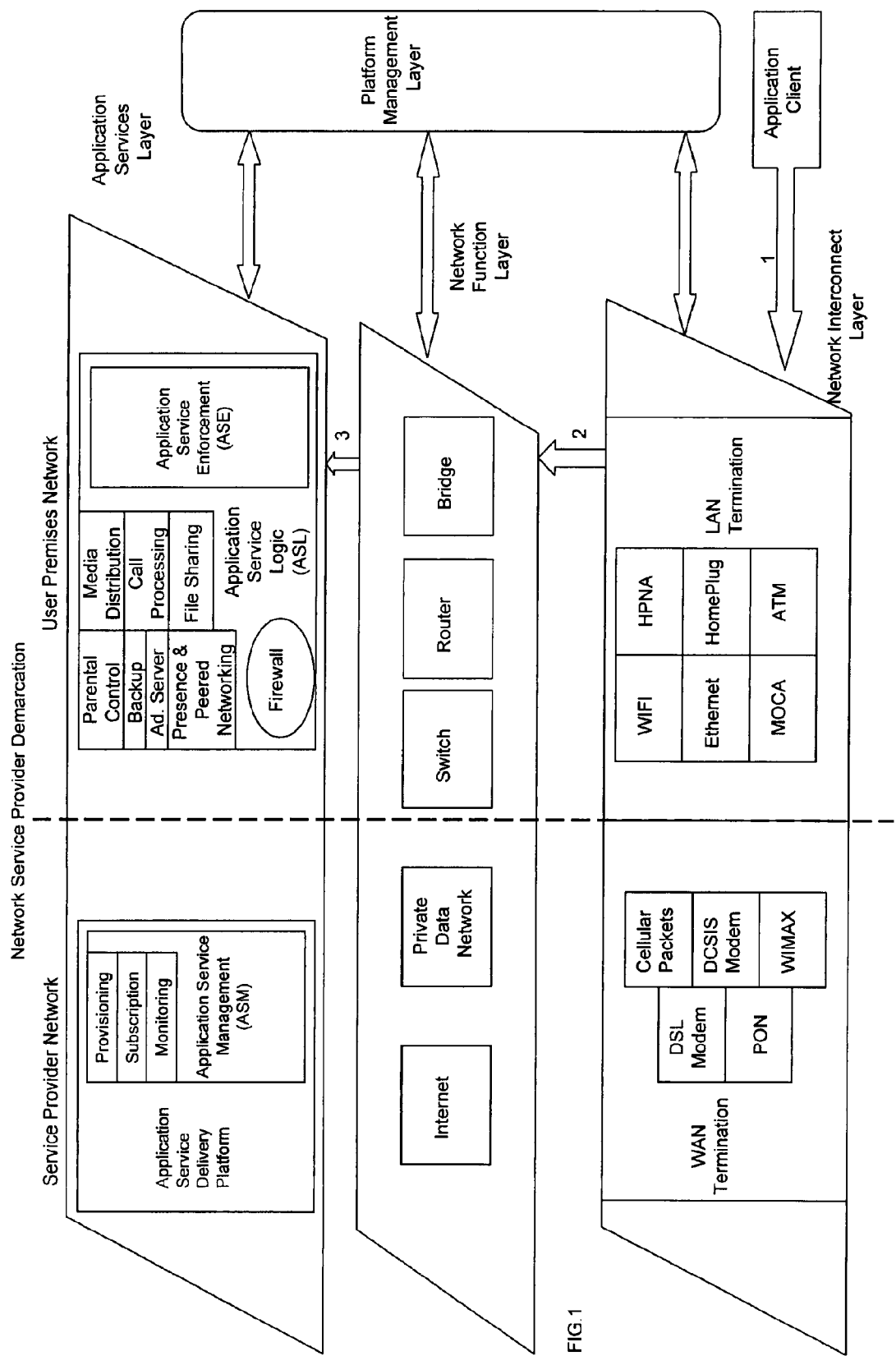
FIG. 1 is a layered logical block diagram with arrows representing steps of a sample logical flow, for an application client to access a specific managed application service, in a gateway device-service management center type network configuration, and shows a first or Network Service Provider Demarcation at the network edge.

Reference now is made in detail to the examples illustrated in the accompanying drawings and discussed below. FIG. 1 is a high-level diagram of the architecture of a gateway-service management center network, as well as the logical flow of how a specific Application Client residing at a User Premises could interact with an Application Service in a gateway device that is being managed in the gateway-service management center network configuration. Heretofore, as described above, many application services that form part of the Application Service Delivery Platform were logically positioned at the AS Layer but on the network side of the Network Service Provider Demarcation (see FIGS. 10 and 11). FIG. 1 shows that, in the exemplary architecture, many of these application service functionalities that were previously offered from network-side servers have now been moved across the Network Service Provider Demarcation and now logically reside at the AS Layer in the User Premises Network, i.e., on the hardware components located in the user premises, such as, by example, a gateway device. In particular, the programming that implements application services is logically positioned on the user premises side of the Network Service Provider Demarcation. The application service on the user premises side that enforces authorization, authentication, configuration, or use of the respective service via an endpoint device is logically depicted in FIG. 1 as the ASE module in the AS Layer of the User Premises Network. The ASE module may also communicate via the wide area network with the ASM logic residing in the service management center.

FIG. 1 thus depicts an approach in which the ASL and ASE functions have moved to the User Premises side. In the example of FIG. 1, the application client would be implemented on an endpoint device, whereas other elements/functions to the right of the Network Service Provider Demarcation are implemented in a gateway device. As discussed more below, the ASL and the ASE functions are implemented as high-level server type logic within the gateway device at a user premises. Hence, elements shown in FIG. 1 that may reside in the user premises gateway device include the user premises-side network function or NF (switch, router or bridge) and the LAN termination for communication with the endpoint devices implementing the application client functions. Thus, with reference to FIG. 1, the first interface, as described above, for enabling bi-directional network layer communications on the user's side of the premises with one or more of the associated endpoint devices resides at the NI Layer and provides the LAN Termination referenced therein. FIG. 1 also depicts the WAN termination providing connectivity to the wide area network (network-side NF—Internet or private wide area data network). The gateway device's second interface, as described above, for enabling bi-directional network layer communications for the associated endpoint devices via a wide area network resides at the NI Layer and provides the WAN Termination referenced therein. The gateway device's second interface also enables bi-directional communications between it and the service management center via the WAN.

With reference to FIG. 1, the core of the logical capacities of the service management center resides on the Service Provider Network, and is depicted as the Application Service Management (ASM) portion of the Application Service Delivery Platform in the AS Layer. The ASM function is implemented in the service management center, which is external to the user premises, and, perforce, on the network side of the Network Service Provider Demarcation. The ASL and ASE functions maintain logical connectivity or interaction with the Application Service Management (ASM) function in the service management center, typically via communication through a wide area network. This logical connectivity is established through an always-on (or on an as needed, periodic basis), secure communication channel between the User Premises AS Layer (ASL and ASE) and the Service Provider AS Layer (ASM) at the service management center. The service management center and the communications of the center with one or more of the gateway devices provides an infrastructure support and/or management of the application services offered to endpoint devices and their users by the logic implemented in the gateway device(s). Effectively, the ASD, considered in its entirety, extends all the way to the User Premises and traverses the Network and Network Service Provider Demarcation. The secure communications channel is established through the NF Layer and the NI layer.

The examples discussed herein also introduce a logical platform management layer to the user premises-side, which allows for inter-layer allocation of local resources. This function guarantees access between the Application Service Logic function on the user premises network and the applications service management function in the service management center by assuring that the local user premises hardware and software modules are functioning at a required state (CPU and memory usage, bandwidth usage, QoS settings, etc.) in order for the ASL to have the necessary resources to establish its required communications path to the ASM.

The platform management layer is also responsible for implementing that part of the managed application services to be performed by the gateway device. In that regard, the platform manager secures and manages the overall hardware platform, given that in this scenario, the NF layer and the AS layer reside on one hardware platform. This secure hardware platform provides a robust and secure operating environment for the AS Layer. So, to establish a secure and robust hardware operating environment, the platform manager must interface with all the layers above it and allow for bi-directional management information flow among all of the functions. For example, if the Application Client is a telephony application and the desired application is call processing, the application must first connect to the LAN termination interface (1). Then a connection must be established to the AS Layer through the NF layer (2). At this point the platform manager determines if there are sufficient resources available for this to take place on the routing and switching modules and if there is not sufficient resources on either the LAN Termination interface or the NF layer functions, it would take the necessary corrective measure to free up the required resources so that the application can execute properly (e.g. prioritize packets, throttle bandwidth, attempt to reduce noise on an RF interface, or free up time slices on a TDMA interface such as MoCA). Once that is done, the connection is established to the AS Layer (3), where the ASE and ASL, having been updated by the ASM in the network, respond instantaneously to the Application Client, completing the service request.

Application services represent functionalities, implemented in the higher layer(s) of the protocol or logical stack above the network layer(s) that may extend up to the top application layer (layer 7 of the OSI model). An application service, for example, provides application server communication with a client functionality of one or more endpoint devices, for the respective service, communicated on top of network layer communications through the interfaces. In the examples, the services are provided on a subscription service basis to users at the premises. Hence, the application service logic provides enforcement regarding authorization, authentication, configuration, and/or use of the respective service via the endpoint devices. The application service includes service and feature functions, implemented and controlled by the application service logic. Management of the application service is based on communications with the service management center via the wide area network.

The illustrated architecture of the gateway device-service management center network enables other features and capabilities that have not previously been available to the user. For instance, peer-to-peer application communication between or among gateways is possible without the need to go through, or utilize resources at, an external service management center. Communications through the service management center are also possible. In addition, given the considerable functionality present in the gateway device, and its ability to manage the various endpoint devices associated with it (as explained below), the user interface with the gateway can be presented and utilized on the home TV. Additionally, information from other endpoint devices, such as the PC, network sources (such as an RSS (Really Simple Syndication) service), may now be overlaid on the TV screen so that, for example, PC messages, or weather information, can be viewed on the TV screen, and the functionality of the PC (or other home-networked endpoint devices) can be accessed from the TV screen.

As shown by the discussion of FIG. 1, application service programming is logically positioned on a user premises side of a logical network demarcation forming an edge of the wide area network at the user premises, that is to say on the user premises side of the Network Service Provider Demarcation. The gateway device programming however, also defines a logical service provider-user demarcation between the user premises and the application service provider, as will be described in more detail with regard to FIG. 2.

Figure 2:
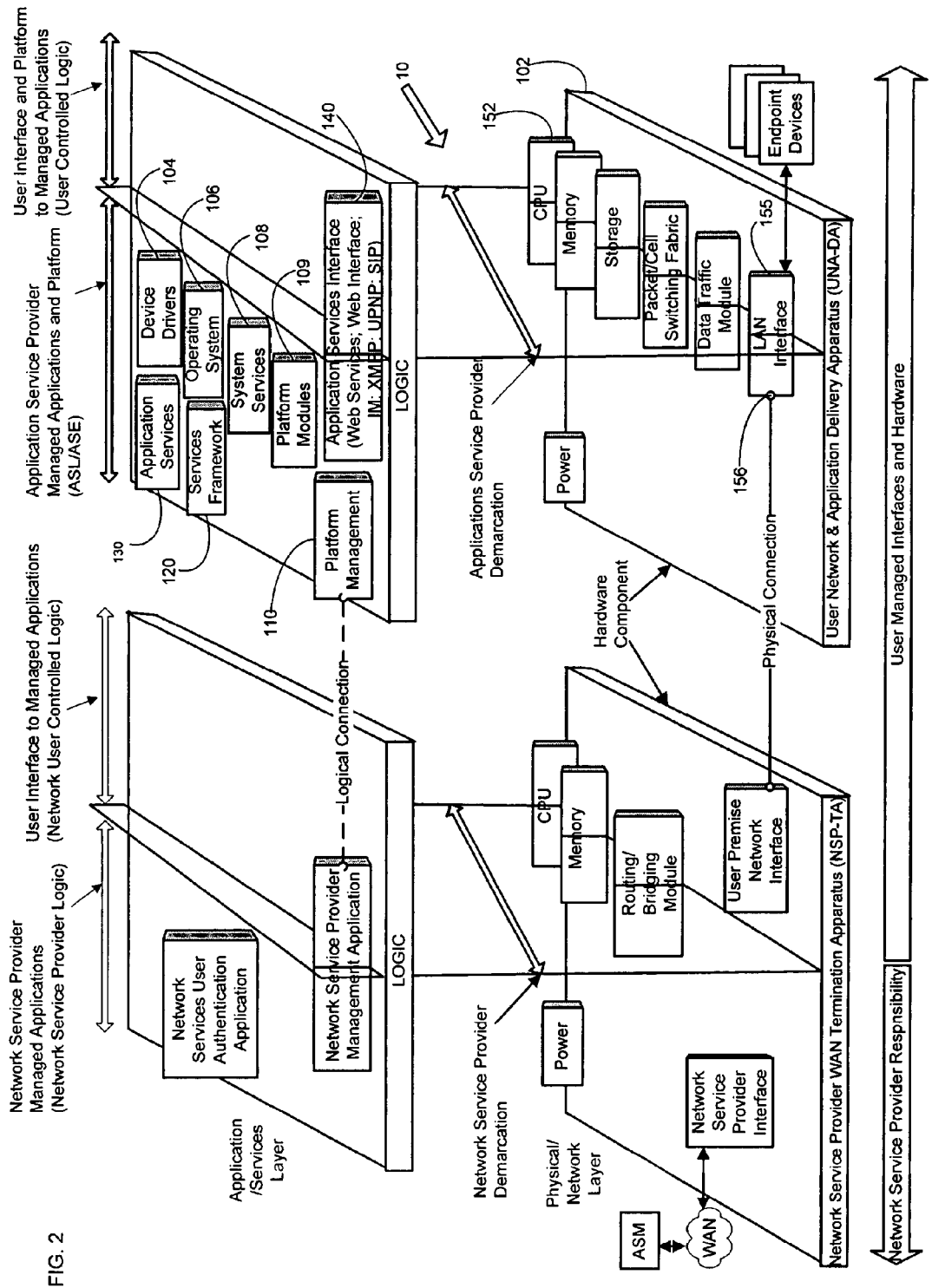
FIG. 2 is a high-level depiction of the logical architecture of the software and hardware of a multi-services applications gateway device, together with a network service provider termination apparatus for broadband connection to a wide area network, and shows the first demarcation as well as a second demarcation between the Application Service Provider and the User.

FIG. 2 depicts logical and physical elements as may be deployed at a user premises. At the Physical/Network layer shown therein, the drawing shows an example of user premises hardware components required for delivering data services (i.e. Internet connectivity) along with a separate, non-integrated managed hardware used in delivering a set of managed application services (e.g. IM, VOD, IP telephony). The Network Service Provider Wide Area Network Termination Apparatus (NSP-TA) allows for a typical termination of a Wide Area Network Services connection, such as DSL, Cable, Fiber, etc, by a network services provider. The NSP-TA provides the WAN Termination in the NI Layer (FIG. 1). The NSP-TA may be an existing user-premises device, provided by the carrier supplying network services to the premises. FIG. 2 also depicts the Network Service Provider Demarcation at the hardware level.

If configured as a standalone device, the NSP-TA device is required to have its own CPU, Memory, physical interfaces and logic control. In order for Network Service Providers to deliver managed services, they typically require a management element controlled by the CPU on the NSP-TA. To depict these logical elements residing on the hardware components, FIG. 2 includes a representation of the user premises Application Services Layer above the hardware layer. This layer corresponds to the AS Layer of FIG. 1, but without reference to any logical elements residing at the network services provider. The management element, represented by the Network Service Provider Managed Application, allows the network service provider to determine the status of the network hardware device and interfaces as well as maintain a certain degree of security enforcement at the customer premises.

As noted, the network service functionality is at the NI and NF Layers and generally does not extend to the AS Layer(s) beyond basic authentication, authorization and state management. As with the hardware components, the logical elements also have a Network Service Provider Demarcation as shown in FIG. 2. On the WAN side, depicted as the Network Service Provider Managed Applications side, of the Network Service Provider Demarcation, resides the applications that are managed, and under the exclusive control, of the network service provider (the Network Service Provider Logic). The User Interface to Managed Applications is present on the LAN side of the Network Service Provider Demarcation within the Application Services Layer. Within this interface resides programming and logic available to users other than the network service provider referred to as the Network User Controlled Logic. The Network User Controlled Logic, which is depicted at the Application Services Layer in FIG. 2, provides a user interface to the Network Service Provider Logic and, to the extent permitted by the Network Service Provider Logic, interaction with or communication between the user and network service provider through the Network User Controlled Logic and the Network Service Provider Logic, and to the NSP-TA hardware components. The Network User Controlled Logic allows for the User of the hardware to make certain, minimal programming changes relevant to their preferences (e.g., user name and password changes, local IP addresses changes, local interface selection). All user devices typically can only communicate with the NSP-TA through one or more of the User Premises Network Interfaces. The user can modify the Network User Controlled Logic through the User Premises Network Interface. The Network Service Provider Demarcation is typically within the NSP-TA, logically dividing the Network Service Provider Interface and the User Premises Network Interface modules. The network service provider does not have any in-depth visibility or significant responsibility beyond the Network Service Provider Demarcation.

In the example, the User Network and Application Delivery Apparatus (UNA-DA), shown on the right hand side of FIG. 2, is a separate managed gateway device 10 that a managed-service provider (which may be different than the network service provider) would control in delivering a set of application services to the user premises. This device is required to have its own dedicated CPU, memory, logic control, as well as its own dedicated set of interfaces. The UNA-DA includes one or more Network Interfaces providing connectivity to the NSP-TA as well as to user premises endpoint devices. The interfaces provide the LAN Termination functionality at the NI Layer (FIG. 1). One skilled in the art will readily recognize, however, that the physical connection that connects the UNA-DA to the NSP-TA also provides connectivity for the UNA-DA to the public (WAN side) network, and is the means by which the UNA-DA accesses the public network. The end point devices connected to the LAN Interface are on the private (LAN) side of that interface. The UNA-DA also includes a switch, router or bridge for the NF Layer.

Programming elements of the UNA-DA in the gateway device 10 are depicted at the Application Services Layer of the UNA-DA. Certain logical elements, depicted as the Application Service Provider Managed Applications and Platform in FIG. 2, on which resides, inter alia, the programming corresponding to the ASL and ASE of FIG. 1, are managed by the managed application service provider's network control center, e.g. by the ASM through a wide area network (WAN) by means of a control channel to the Application Service Provider Managed Applications and Platform. The Application Service Provider Managed Applications and Platform includes a platform management logic module that, with other programming in the Platform and the ASM, allows the managed application service provider to control the hardware elements of the UNA-DA in addition to any other relevant application services logic or hardware that may reside on the user premises. For example, this programming enables a managed application service provider to control and manage the hardware elements on the UNA-DA to ensure proper use and allocation of the UNA-DA's processing, memory, storage, and bandwidth, to monitor local hardware security and generate needed alarms or protection sequences, and to prioritize applications based on a set of established policies. The user would have control over specific parameters of application services obtained through the UNA-DA, through the User Interface and Platform to Managed Applications (User Controlled Logic) shown in FIG. 2. These parameters allow the user to control the local behavior of the interfaces and to configure the specific applications to accommodate the user network as configured by the user and to implement the user preferences for those applications.

Hence, FIG. 2 illustrates the logical architecture of the software and hardware of the UNA-DA in the form of a multi-services applications gateway device 10, together with a network service provider termination apparatus for broadband connection to a wide area network in this case implemented by the NSP-TA. The gateway device 10 is an application delivery apparatus, for delivering application services to endpoint devices using network layer communications through the network termination apparatus and the wide area network. The drawing also illustrates relevant demarcations between functionalities of the gateway device and termination, which delineate control/management access. The arrangement of the ASL and ASE logic between the two demarcations and the attendant logical demarcations in management access to the hardware resources at the premises result in significant management control by the application service provider and relieve the user of significant burdens in arranging and configuring the systems/services at the premises. Hence, we will consider the demarcations and the resulting relationships to the provider and the user at the various layers, in more detail.

As outlined above, the logical Network Service Provider Demarcation is formed at the edge of the wide area network (WAN) at the user premises, that is to say between the WAN and the equipment in the user premises. The arrows at the bottom of FIG. 2 show that the area covered to the LEFT of the Network Service Provider Demarcation (as depicted by the lower arrow on the left of vertical plane) is the Network Service Providers responsibility. From the perspective of a network service provider, anything to the RIGHT of that first demarcation (as depicted by the lower arrow on the right of the vertical plane) normally would be the customer's responsibility. As shown, this separation at the first demarcation includes delineation among the hardware elements for the NSP-TA.

As shown in FIG. 2, the application services layer also defines an Application Service Provider Demarcation, which extends through the hardware modules on the "Hardware Components" plane as well as the programming in the logical application services plane. In this way, the drawing depicts those modules that are under the responsibility of Application Service Provider (as depicted by the top middle bi-directional arrow). On the logic plane, the user can interact with the managed services through the Application Services Interface function 140, and the Application Service Provider can interact with the Network Service Provider's managed Applications through the Network Service Provider Managed Application function. This is an optional function but it helps show how the UNA-DA can interface with Network devices from a network services provider, and provide a unified application interface to both hardware elements (NSA-TA, UNA-DA). This management relationship is represented by a dotted line on the logic layer between the Platform Management Logic module 110 and the network service provider management application in the NSP-TA. In effect, the application service provider can "manage" the NSP-TA for the user, even though it is not the application service provider's hardware. In the case where the application service provider is a network service provider as well (the NSP-TA is the application service provider's own hardware), then it would work in practically the same way.

FIG. 2 also shows how the programming effectively partitions the hardware at the Application Service Provider Demarcation, which gives the application service provider the ability to provide a managed Peer-2-Peer private service that will enable that provider to use the UNA-DA for performing distributed computing, search, indexing, file backup, sharing, etc., all managed and controlled by the provider's service management center.

The arrows at the top of FIG. 2 thus show the delineations in management responsibility created by the two logical demarcations. As at the bottom, the area covered to the LEFT of the Network Service Provider Demarcation (as depicted by the upper arrow on the left of first vertical plane) is the Network Service Provider's responsibility. Anything to the RIGHT of that second demarcation plane (as depicted by the upper arrow on the right of the second vertical plane) would be the customer's responsibility. However, the logic and hardware in the NSP-TA between the two vertical planes (as depicted by the upper arrow on the left of second vertical plane) is the Application Service Provider's responsibility. As noted above, a logical interface may be provided to the NSP-TA may enable the Application Service Provider's to assume the user's responsibility in managing the premises side of the NSP-TA as depicted by the upper arrow on the right of the first vertical plane.

To identify the separation of, and distinguish between, the programming and hardware components subject to control by the application service provider and those subject to control by the user premises, FIG. 2 identifies a dividing line across the logical elements of the UNA-DA, and a corresponding dividing line across hardware components, referred to as the Applications Service Provider Demarcation. The Applications Service Provider Demarcation is flexible in that it may extend logically through the Application Services Interface (and, in a hardware context, through the Network Interface) to other devices that are under the logical control of the Application Services Provider Managed Applications and Platform, given that "services" are not restricted to a specific hardware boundary.

There is no hard requirement for cross management between the UNDA-DA and the NSP-TA. Under this first scenario the user is responsible for making the configuration changes in the specific user controlled logic modules in order to get the two devices to communicate with each other. Optionally the two sub-systems can be combined together, either physically in one hardware device, or logically as two separate hardware devices, but having one managed interface.

Figure 10:
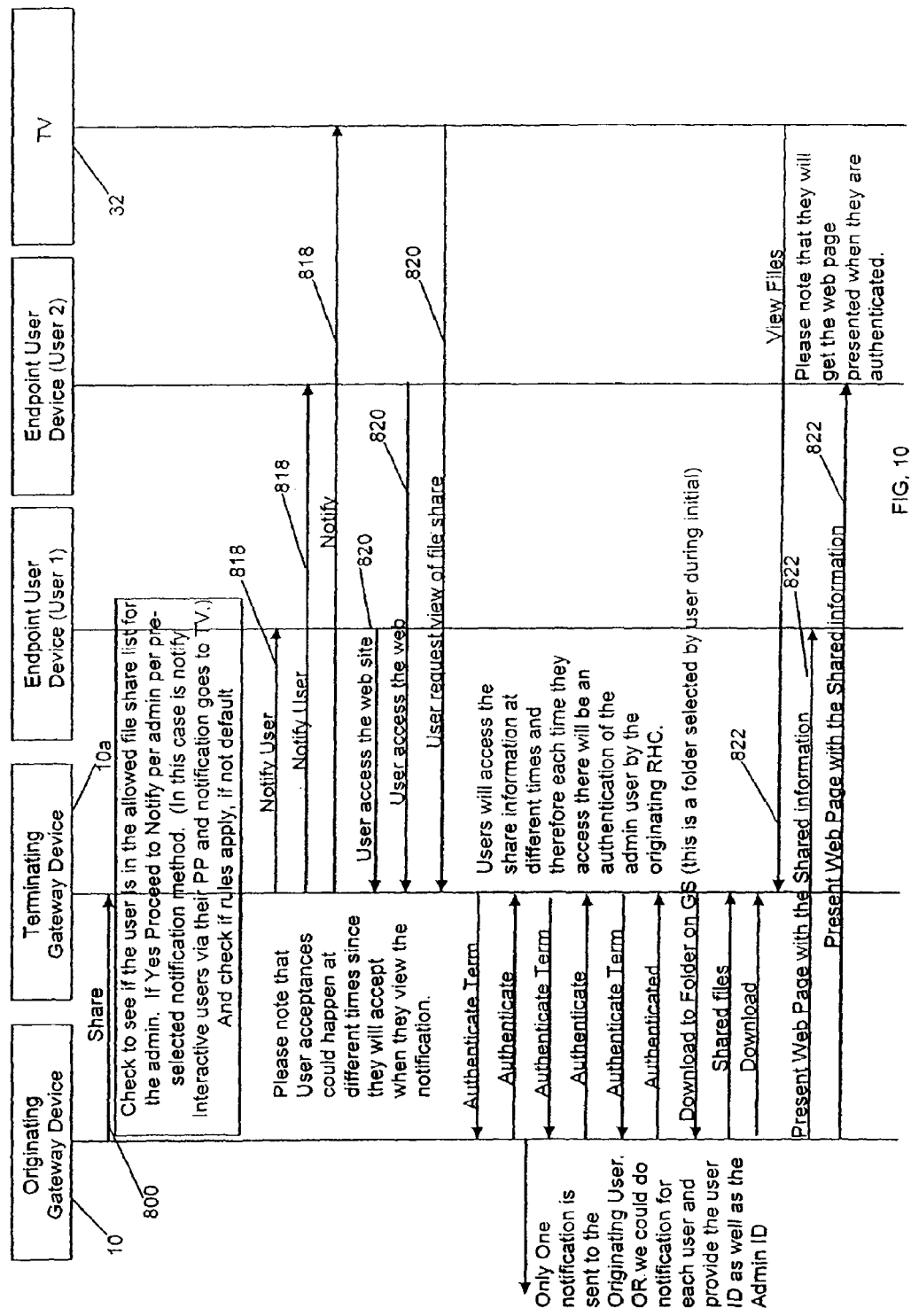

As noted, the two hardware regimes described above (NSP-TA and the UNA-DA) may be combined into one managed hardware platform and, thereby, replace the need for the user to have access to the User Premises Network Interface with the logic residing in the Platform Management logic module of the Application Service Provider Managed Applications and Platform (compare to above-discussed FIG. 10). This would in effect replace the "user" access with a managed "machine" access, for aspects of the NSP-TA, as well as aspects of the application services offered through the UNA-DA. Thus, the combination creates an integral gateway device providing both network service and application services, under centralized management. Although integrated, network interconnect functions of the NSP-TA may still be managed by the network service provider, as in the example of FIG. 2. Those skilled in the art will readily see additional combinations and configurations for the hardware comprising the NSP-TA and the UNA-DA. For example, in a further embodiment, all the hardware dedicated to the Network Service Provider Interface may reside and be integral with the hardware comprising the UNA-DA. Thus, the hardware for the WAN interface may reside on the UNA-DA.

Figure 3A:
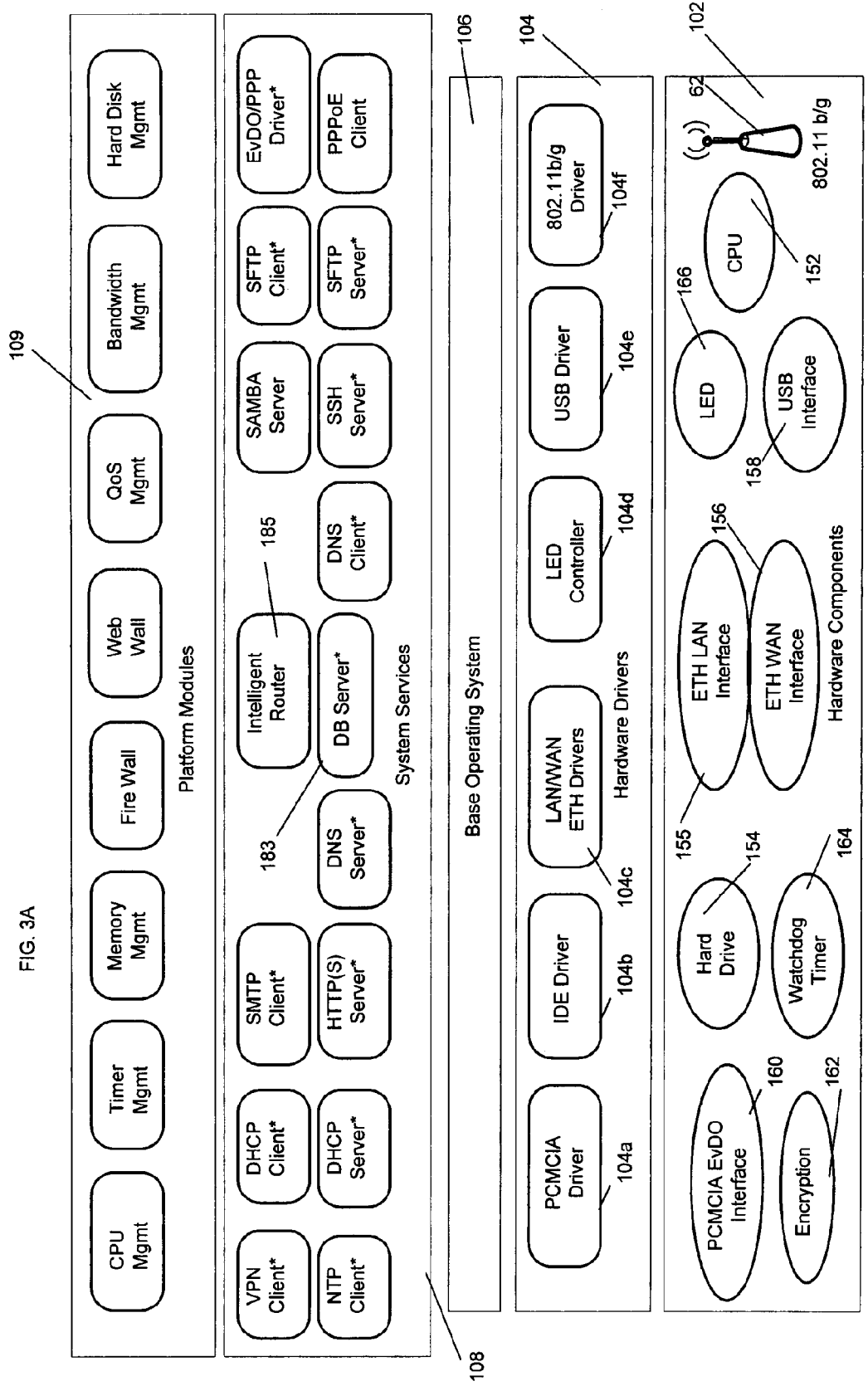

The composition of the premises gateway device 10, earlier described with reference to FIG. 2, is now described in greater detail with reference to that drawing together with FIGS. 3A-3C. FIG. 2 illustrates the relationship of the demarcations to hardware and software of the gateway device 10 and an associated NSP-TA device providing the wide area network termination at the user premises. As shown in FIGS. 3A and 3B, the gateway device 10 utilizes a layered architecture, which enables the encapsulation of similar functionality and the minimization of dependencies between functions in different layers. FIG. 3A shows the lower portion of the layered architecture, and FIG. 3B shows the upper portion of the layered architecture. The completed set of layers can be conceptualized as if FIG. 3B was combined with FIG. 3A, with the layers of FIG. 3B above those of FIG. 3A. FIGS. 2, 3A and 3B also depict exemplary functionality (hardware and logical) resident in each of the layers.

The layers include a hardware layer 102, and device driver software 104 for allowing the processor to operate other hardware elements of the gateway device 10. FIG. 3C is a functional block diagram illustrating interconnection of exemplary elements of the hardware layer 102.

The logical elements of the NI Layer residing on the gateway device 10 are found in the Hardware Drivers 104, which govern the operation of the Hardware Components 102. The processor runs an operating system shown at layer 106, which plays a role in each of the NI, NF, AS and Platform Management Layers (FIG. 1). The layered architecture 100 also includes software for systems services 108 and for the platform management layer shown at 110 in this drawing. Logical elements represented by the NF Layer depicted in FIG. 1 are comprised of elements from the system services 108. In a similar fashion, the Platform Management Layer depicted in FIG. 1 is implemented in the exemplary architecture of FIGS. 2, 3A and 3B by the platform modules 109 and the platform management layer 110.

Particular logical elements comprising the ASL and ASE functionalities of the AS Layer represented in FIG. 1, and that reside on the gateway device 10 (predominately in the Application Service Provider Managed Applications and Platform of the UNA-DA shown in FIG. 2) are depicted in FIG. 3B, and comprise logical elements from each of services framework 120 and application services 130. The layered architecture facilitates reuse or sharing of logic across the layers to provide a managed service framework 120. The service management functionality provided by the framework 120 enables deployment of new services as pluggable modules comprising computer readable instructions, data structures, program modules, objects, and other configuration data, in a plug and play fashion. The layered service architecture additionally provides the gateway device 10 with intra-process communication and inter-process communication amongst the many services and modules in the service framework layer 120 that enables the provisioning, management and execution of many applications and services 130, depicted e.g. services A, B . . . N at the gateway device 10. Additionally provided are the application service interfaces 140 that enable communications from user endpoint devices with service environments. In that regard, the interfaces 140 enable the application service logic 130 to act as an appropriate server with respect to client device application or service functionality of the endpoint devices. The application service interfaces 140 also enable corresponding interfaces for the application services with aspects of service environments implemented outside the user premises. In that regard, the interfaces 140 enable the application service logic 130 to act as an appropriate client, for extending the application or service related communications to a server accessed via the wide area network 99, such as a server of the service management center 50. For example, the gateway device may appear as a SIP server to a SIP client in an end point device, e.g. for a VoIP telephone service; but the gateway device will appear as a SIP client with respect to some related functions provided by a server (such as a SIP directory server) provided by the service management center 50.

FIG. 2 thus depicts a high level service framework upon which are built services, e.g. downloaded via the service management center network 50 and a wide area network as packages that are developed and offered by a service entity for customers. These services may be offered as a part of a default service package provisioned and configured at the gateway device 10, or provisioned and configured subject to user subscription and may be added at any time as plug-in service modules in cooperation with the service management center, as discussed later. It is understood however, that while the gateway device 10 includes much of the intelligence or service logic for providing various services, it is also possible that for some services, some or all of service logic may reside in the service management center network and/or with a third party provider.

As shown, the base support layer 102 comprises hardware components including a processor device 152, e.g. a system on chip central processing unit ("CPU") that includes processing elements, digital signal processor resources and memory. The CPU 152 is also coupled to a random access memory or "RAM" (see FIG. 3C) and additionally, non-volatile hard drive/disk magnetic and/or optical disk memory storage 154. Generally, the above-identified computer readable media provide non-volatile storage of computer readable instructions, data structures, program modules, objects, service configuration data and other data for use by the gateway device. The non-volatile hard drive/disk magnetic and/or optical disk memory storage 154 may be partitioned into a network side which is the repository for storing all of the service logic and data associated with executing services subscribed to by the user, and, is invisible to the user, and, a user side for storing user generated content and applications in which the user has visibility. Although not shown, the CPU 152 may be coupled to a microcontroller for controlling a display device.

Additional hardware components include one or more Ethernet LAN and WAN interface cards 155, 156 (e.g. 802.11, T1, T3, 56 kb, X.25, DSL or xDSL) which may include broadband connections (e.g. ISDN, Frame Relay, ATM, Gigabit Ethernet, Ethernet over SONET, etc.), wireless connections, or some combination of any or all of the above. The card 155 referred to as the LAN interface card provides data communication connectivity within the user premises, essentially, for communication via a user premises network 60 with any endpoint devices operating within the premises. The card 156 referred to as the WAN interface card provides data communication connectivity for the gateway device 10 and endpoint devices communicating through the device 10, with the wide area IP network 99. For additional or alternative customer premises communications, the hardware components 102 may also include one or more USB interfaces 158; and for additional or alternative communications with the wide area network, the hardware components may also include the PCMCIA EvDO interface card 160.

A data encryption/decryption unit 162 is additionally provided as part of the architecture for providing data security features. A watchdog timer element or like timer reset element 164 is provided as is one or more LED devices 166 for indicating status and other usable information to users of the gateway device 10.

The gateway device provides an in-premises footprint enabling the service connectivity and local management to client(s). The implementation of functions and the related control such as a router (with quality of service (QoS)), firewall, VoIP gateway, voice services and voice mail may be embodied and performed within the CPU 152.

The discussion of the gateway hardware layer above and the illustration thereof in the drawings provides a high-level functional disclosure of an example of the hardware that may be used in the gateway device. Those skilled in the art will recognize that the gateway device may utilize other hardware platforms or configurations.

Continuing, as shown in FIG. 3A, the device driver layer 104 comprises a multitude of driver interfaces including but not limited to: a PCMCIA driver 104a, for enabling low level communication between the gateway CPU 152 and the PCMCIA network interface card wireless interface, an IDE driver 104b for enabling low level communication between the gateway CPU 152 and the local mass memory storage element, and LAN/WAN drivers 104c for enabling low level communication between the gateway CPU 152 and the respective network interface cards 155 and 156. The exemplary driver layer also includes an LED driver/controller 104d for driving LED(s) 166, a USB driver 104e allowing CPU 152 to communicate via USB interface 158, and an 802.11 b/g (or n) wireless network driver 104f for allowing the CPU 152 to communicate via the access point 62. The drivers provide the logical connectivity between the low level hardware devices 102 and the operating system 106 which controls the execution of computer programs and provides scheduling, input-output control, file and data management, memory management, and communication control and related services for the gateway device. With respect to the operating system 106, the gateway computing may support any embedded operating system, any real-time operating system, any open source operating system, any proprietary operating system, or even any operating systems for mobile computing devices as long as the operational needs of the client discussed herein below can be met. Exemplary operating systems that may be employed include Windows®, Macintosh®, Linux or UNIX or even an embedded Linux operating system. For instance, the gateway device 10 may be advantageously provided with an embedded operating system 106 that provides operating system functions such as multiple threads, first-in first-out or round robin scheduling, semaphores, mutexes, condition variables, message queues, etc.

Built upon the system operating system 106 is a system services support layer 108 providing both client-like and server-like functions that enable a wide range of functionality for the types of services capable of being managed by the gateway device 10. For instance, there is provided a Dynamic Host Configuration Protocol (DHCP) client and server software modules. The DHCP client particularly requests via a UDP/IP (User Datagram Protocol/Internet Protocol (e.g. Ipv4, Ipv6, etc.) configured connection information such as the IP address that the gateway device 10 has been dynamically assigned by a DHCP service (not shown), and/or any the subnet mask information, the gateway device should be using. The DHCP server dynamically assigns or allocates network IP addresses to subordinate client endpoints on a leased, e.g. timed basis. A Virtual Private Network (VPN) client may communicate via a proxy server in the service control network 50, according to a VPN protocol or some other tunneling or encapsulation protocol. An SMPT client handles incoming/outgoing email over TCP, in accordance with the Simple Mail Transfer protocol. A Network Time Protocol (NTP) (RFC 1305) generates and correlates timestamps for network events and generally provides time synchronization and distribution for the Internet. A Domain Name Server (DNS) client and server combination are used by the IP stack to resolve fully-qualified host or symbolic names, i.e. mapping host names to IP addresses.

An HTTP(S) server handles secure Hypertext Transfer Protocol (HTTP) (Secure Sockets Layer) communications and provides a set of rules for exchanges between a browser client and a server over TCP. It provides for the transfer of information such as hypertext and hypermedia, and for the recognition of file types. HTTP provides stateless transactions between the client and server.

A Secure File Transfer Protocol (SFTP) client and server combination govern the ability for file transfer over TCP. A SAMBA server is an open source program providing Common Internet Files Services (CIFS) including, but not limited to file and print services, authentication and authorization, name resolution, and service announcement (browsing). An EvDO/PPP driver includes a Point-to-Point Protocol (PPP) daemon configuration for wireless broadband services. A PPPoE (Point-to-Point Protocol over Ethernet) client combines the Point-to-Point Protocol (PPP), commonly used in dialup connections, with the Ethernet protocol; and it supports and provides authentication and management of multiple broadband subscribers in a local area network without any special support required from either the telephone company or an Internet service provider (ISP). The gateway device 10 is thus adapted for connecting multiple computer users on an Ethernet local area network to a remote site through the gateway and can be used to enable all users of an office or home to share a common Digital Subscriber Line (DSL), cable modem, or wireless connection to the Internet. A Secure Shell or SSH server implemented with HTTP protocol provides network protocol functionality adapted for establishing a secure channel between a local and a remote computer and encrypts traffic between secure devices by using public-key cryptography to authenticate the remote computer and (optionally) to allow the remote computer to authenticate the user.

Additionally provided as part of the system services layer 108 is intelligent routing capability provided by an intelligent router device 185 that provides Quality of Service (QoS, guaranteed bandwidth) intelligent routing services, for example, by enforcing routing protocol rules and supporting unlimited multiple input sources and unlimited multiple destinations and, particularly, for routing communications to networked digital endpoint devices subordinate to the gateway. A central database server 183 handles all of the database aspects of the system. For example, the database server 183 maintains and updates registries and status of connected digital endpoint devices, maintains and updates service configuration data, services specific data (e.g. indexes of backed-up files, other service specific indexes, metadata related to media services, etc.) and firmware configurations for the devices. The database server 183 may also store billing and transaction detail records and performance diagnostics. The database server logic 183 also satisfies all other database storage needs as will be described in greater detail herein.

Referring back to FIGS. 2 and 3A, built on top of the system services layer 108 is the platform module layer 109. The platform module layer 109 provides a software framework for operating system and communications level platform functionality such as CPU management; Timer management; memory management functions; a firewall; a web wall for providing seamless WWW access over visual displays via access technologies enumerated herein, e.g. HTTP, SMS (Short Messaging Service) and WAP (Wireless Access Protocol); QoS management features, bandwidth management features, and, hard disk drive management features. The layered architecture further provides a platform management layer 110 as shown in FIG. 3B, which together with the platform modules 109 implement the platform management layer/logic discussed earlier (with regard to FIG. 1). In the layered architecture, the platform management layer 110 (and elements shown above it in FIG. 3B) is built upon the platform modules 109.

The features/functions in the layer 110 include a platform manager module which will implement unique rules based notification services. On operational failure, for example, when one of the components or services fails, the platform manager would detect this failure and take appropriate action such as implement a sequence of rules to provide notification to a user. A scheduler module manages scheduled device maintenance, managing scheduled services, e.g. back-up services, etc. The layer 110 also includes a diagnostics module and a firmware upgrades management module for managing firmware upgrades. A resource management module manages system resource's and digital contention amongst the various resources, e.g. CPU/Bandwidth utilization, etc. A display management module and a logger management module store and track gateway log-in activity of users and applications, e.g. voice call logs, at the user premises. The platform management layer 110 in concert with resource and service management components enforces the separation of network side managed service control and user side delegations depending upon service subscriptions and configurations. For example, the platform and resource management encompass rules and guidelines provided according to subscribed services that act to enforce, manage and control input/output operations, and use of hard drives space etc. A demarcation point, logically depicted as the Application Service Provider Demarcation in FIG. 2, is thus defined that provides a hard line between what is "owned by" the customer and what is "owned by" the application service provider.

The logical platform management layer 110 allows for inter-layer allocation of local resources. This function guarantees access between the application service/management logic implemented at the higher layers in the gateway device 10 and the applications service management function in the service management center 50, by assuring that the local user premises hardware and software modules are functioning at a required state (CPU and memory usage, bandwidth usage, QoS settings, etc.). The platform manager is also responsible for implementing that part of the managed application services to be performed by the gateway device. In that regard, the platform manager secures and manages the overall hardware platform, given that in this scenario, the network function layer and the application service layer reside on one hardware platform. This secure hardware platform provides a robust and secure operating environment for the application services layer. So, to establish a secure and robust hardware operating environment, the platform management layer must interface with all the layers above it and allow for bi-directional management information flow among all of the functions.

Referring back to FIGS. 2 and 3B, built on top of the platform management layer 110 is the Services Framework 120, which provides a library of application support service processes that facilitate data collection and data distribution to and from the multimedia endpoint devices. The application support service processes include, but are not limited to: an authentication manager for use in authenticating devices connected to the gateway device; a billing manager for collecting and formatting service records and service usage by endpoint devices, e.g. calls, back-up services etc.; a fault manager for detecting and managing determined system and/or service faults that are monitored and used for performance monitoring and diagnostics; a database manager; a control channel interface via which the gateway initiates secure communications with the operations support infrastructure; a configuration manager for tracking and maintaining device configuration; a user manager; a service manager for managing service configuration and firmware versions for subscribed services provided at the gateway device; and a statistics manager for collecting and formatting features associated with the gateway device. Statistics may relate to use of one or more services and associated time-stamped events that are tracked.

Built on top of the Services Framework layer 120 is the Application Services layer 130 providing library of user application services and application support threads including, but not limited to: file sharing functionality; backup services functionality; home storage functionality; network device management functionality; photo editing functionality; home automation functionality; media services functionality; call processing functionality; voice mail and interactive voice response functionality; presence and networking functionality; parental control functionality; and intelligent ads management functionality. The multi-services applications gateway 10 further provides application service interfaces 140 that are used to enable a variety of user applications and communications modalities.

For instance, the SIP Interface 141 is an interface to the generic transactional model defined by the Session Initiation Protocol (SIP) that provides a standard for initiating, modifying or terminating interactive user sessions that involve one or more multimedia elements that can include voice, video, instant messaging, online games, etc., by providing access to dialog functionality from the transaction interface. For instance a SIP signaling interface enables connection to a SIP network that is served by a SIP directory server via a Session Border Controller element in the service management center.

The Web Interface 142 enables HTTP interactions (requests and responses) between two applications. The Web services interface 149 provides the access interface and manages authentication as multi-services gateway devices access the service management center via web services. The IM Interface 144 is a client that enables the multi-services gateway device 10 to connect to one or more specific IM network(s). As further shown in FIG. 3B, the UpNp (Universal Plug and Play) interface enables connectivity to other stand-alone devices and PCs from many different vendors.

The XMPP interface 145 is provided to implement the protocol for streaming (XML) elements via the gateway device 10, in order to exchange messages and presence information in close to real time, e.g. between two gateway devices. The core features of XMPP provide the building blocks for many types of near-real-time applications, which may be layered as application services on top of the base TCP/IP transport protocol layers by sending application-specific data qualified by particular XML namespaces. In the example, the XMPP interface 145 provides the basic functionality expected of an instant messaging (IM) and presence application that enable users to perform the following functions including, but not limited to: 1) Exchange messages with other users; 2) Exchange presence information with other devices; 3) Manage subscriptions to and from other users; 4) Manage items in a contact list (in XMPP this is called a "roster"); and 5) Block communications to or from specific other users by assigning and enforcing privileges to communicate and send or share content amongst users (buddies) and other devices.

The gateway devices 10 and the service management center 50 utilize a presence and networking message based protocol for establishing communication channels between the service management center 50 and the gateway device 10 as well as for communications among the gateway devices 10. Between the center 50 and the gateway device 10, the presence and networking message based protocol may facilitate many functions associated with the operation and use of the managed system architecture (e.g., an always on control channel and its use in the center's management of the gateway devices 10, its use in center 50 to gateway device 10 communication including authentication, authorization and the like). Gateway to gateway communications, using the presence and networking message based protocol may also be used in support of the file sharing operations discussed herein.

The gateway device 10 may also be configured as an endpoint, with respect to the presence and networking message based protocol communications, so as to expose resources/endpoint devices under its management (where the management includes notification through those endpoint devices, and file sharing among those endpoint devices) but without necessarily extending (or requiring the extension of) the presence and networking messaging protocol functionality beyond the gateway device 10 to the endpoints. In this case, the gateway device 10 is a presence and networking messaging protocol client/endpoint with implemented application service logic that enables the gateway device user and a presence and networking messaging protocol user/external entity to utilize the several endpoint device drivers hosted in the gateway device 10, to facilitate communications with endpoints that do not themselves support the presence and networking messaging protocol based communications. Each of the drivers is specialized with a unique set of attributes and operations to control and manage the various endpoint devices associated with the gateway device 10. The gateway device implemented client interacts with the driver through the application service logic in the gateway device. The implemented application service logic is configured by the subscriber/gateway user to specify which devices, attributes and operations are exposed to the peer and present communications. Through the service management center 50, the service provider may also specify parameters of operation and presentation of application services provisioned by the service provider. The implemented application service logic can also be configured by the gateway user or the service provider to specify rules for the gateway device's presentation/notification of incoming presence and networking messaging protocol based messages to the user and the routing of those messages to the managed endpoint device through their respective drivers. The implemented application service logic thus acts as an intermediary between the gateway device endpoint logic and the endpoint device drivers.

As noted, the gateway device 10 (and the application service logic) may be managed by the service management center 50. Thus, the entire presence and networking messaging based protocol client on the gateway device 10, and associated application service logic for file sharing and other application services on the gateway device 10, and associated application service logic, may be provisioned and governed by the service provider through the service management center 50. This would allow the service provider to set the parameters of access, control, presentation, and level of service, with the gateway user able to make programming and service choices within the parameters set by the service provider. The presence and networking messaging based protocol client on the gateway device 10, file sharing and the other various services available through the gateway (e.g., home automation, video download), and the features or capabilities within each of those services, may be provisioned, configured, managed, initiated, or terminated through the service management center 50. Thus, the presence and networking messaging based protocol client may be managed externally to provide different levels and types of service and capabilities. The presence and networking based communication capabilities are illustrated and described in greater detail in U.S. Provisional Application No. 60/882,865 Filed Dec. 29, 2006 entitled "A MULTI-SERVICES APPLICATION GATEWAY AND SYSTEM EMPLOYING THE SAME;" U.S. Provisional Application No. 60/882,862 Filed Dec. 29, 2006 entitled "SYSTEM AND METHOD FOR PROVIDING NETWORK SUPPORT SERVICES AND PREMISE GATEWAY SUPPORT INFRASTRUCTURE;" and PCT Application, Filed Sep. 7, 2007 entitled "PRESENCE STATUS NOTIFICATION FROM DIGITAL ENDPOINT DEVICES THROUGH A MULTI-SERVICES GATEWAY DEVICE AT THE USER PREMISES" PCT/US07/19534 and the disclosures of the presence and networking messaging based communication capabilities from those applications are entirely incorporated herein by reference.

Figure 3C:
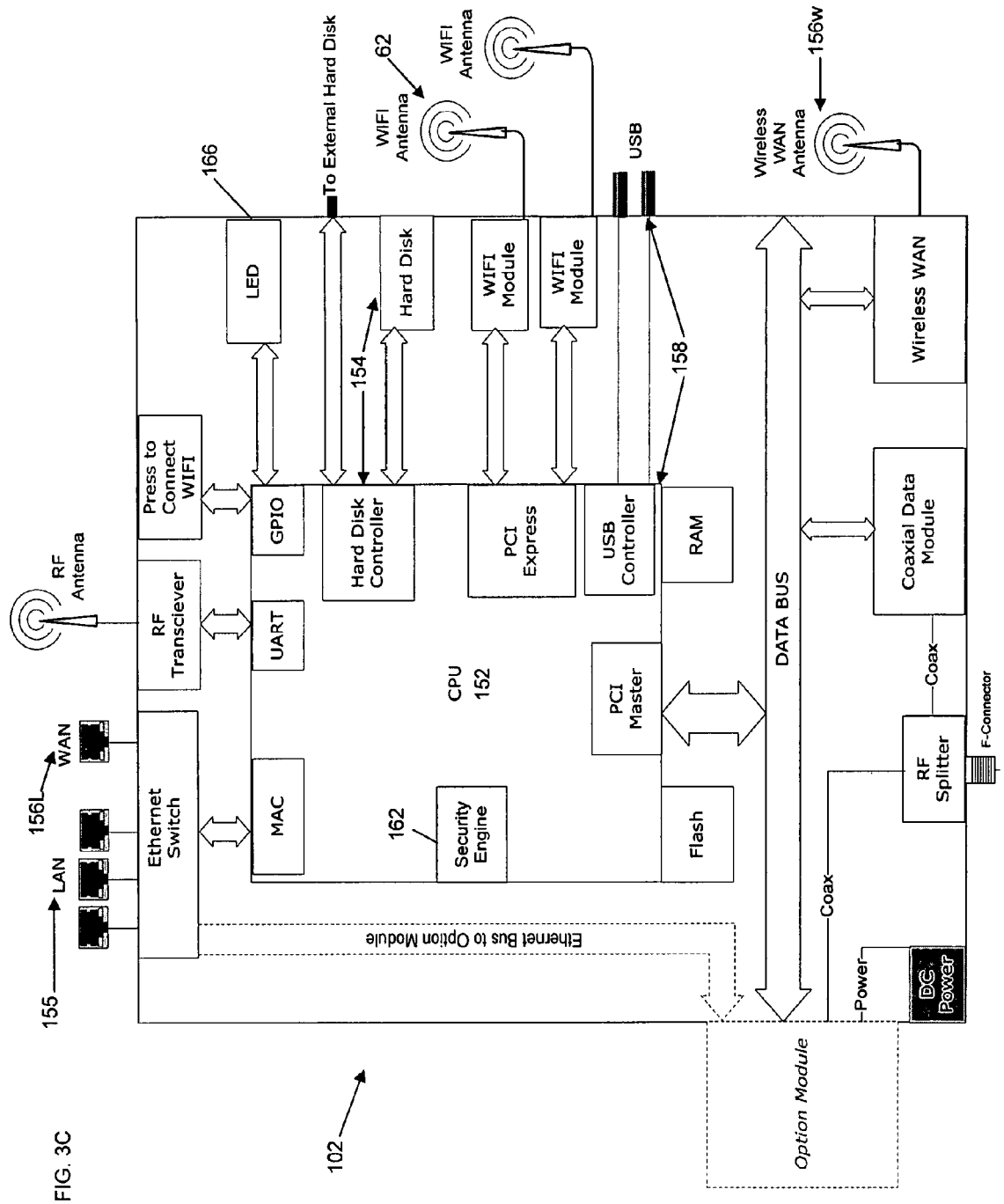

As noted, FIG. 3C provides a functional block diagram of exemplary elements of the hardware layer 102. For example, a system on a chip provides the CPU 152 and associated system components. The CPU 152 is also coupled to a random access memory ("RAM") and flash memory. The system on a chip also includes a hard drive controller for controlling a hard disk drive, and together the controller and drive form the hard disk example of the storage 154. An Ethernet switch and associated LAN port(s) provide the Ethernet LAN interface 155; and the Ethernet switch and associated WAN port provide a landline implementation of the WAN interface 156L, for connection to a broadband modem or the like implementing the NSP-TA. The WAN interface may also be wireless, as implemented at 156w for example by a wireless WAN module and associated antenna. An example of such an interface would be the EvDO interface discussed earlier. If the gateway device uses the wireless WAN interface 156w, there would be no separate NSP-TA.

In the example of FIG. 3C, a USB controller in the system on a chip and one or more associated USB ports provide the USB interface 158. The USB interface 158 may provide an alternate in-premises data communication link instead of or in addition to the wired or wireless Ethernet LAN communications. The system on a chip includes a security engine, which performs the functions of the data encryption/decryption unit 162.

The hardware layer 102 may also include an option module. The UNA-DA hardware components at layer 102 have multiple interfaces for connection to such an option module. These interfaces, by way of example, could be a data bus (e.g. PCI, etc), network interface (e.g. Ethernet (RJ45), MoCA/HPNA (Coax)) and Power feeds. The option module allows additional, functionality to be added to the base UNA-DA functionality of the gateway device. For example, this additional functionality could be everything from support for a variety of extra Wide Area Network Interfaces (e.g. xDSL, DOCSIS, Fiber (PON), Cellular Packet, WIMAX, etc.), Media Processing (e.g. Cable TV termination, Digital Video Recording, Satellite TV Termination, etc), to Voice Processing (FXS, FXO, Speech Detection, Voice to Text, etc). The option module may have its own standalone CPU, Memory, I/O, Storage, or provide additional functionality by its use of the CPU, Memory, I/O, and storage facilities off of the main hardware board. The option module may or may not be managed directly by the Platform Management of the UNA-DA.

Those skilled in the art will recognize that functions of the service management center, which reside in the Application Service Management node on the Service Provider Network, as depicted in FIG. 1, may be implemented in a variety of different ways, on one or more computer hardware platforms connected to 10 gateway devices via a wide area network. FIG. 4 depicts an example wherein the implementation is on Internet or other wide area IP network 99. The example uses a distributed processing approach, in which the elements/platforms implementing the service management center are interconnected for communication and for wide area communication, and in this way, those elements form a network 50 for implementing the service management center.

As shown in FIG. 4, the service management center network, through the logical capabilities earlier depicted in FIG. 4 as the ASM module of the ASD Platform at the AS Layer, manages application services for a number of gateway devices 10, 10$_1$ . . . 10$_n$ located at various users' premises. These application services, shown as ASL and ASE in FIG. 1, implement their functionality within the Application Services Layer (FIG. 1), through programming that resides, at least in part, within the Application Service Provider Managed Applications and Platform of the UNA-DA (FIG. 2). As shown in FIG. 4, secure connectivity to the service management center network 50 is provided, in one embodiment, via a WAN Termination interface, such as Ethernet WAN 53 over a broadband connection via the public Internet 99, or, for example, via a wireless EvDO (Evolution Data Optimized) Internet data interface embodied as a PCMCIA (personal computer memory) wireless card 56. When the WAN Termination interface 53 is used, for example, it may provide connectivity to a broadband modem serving as the NSP-TA of FIG. 2, either as a separate unit or on a board included within the gateway device 10. If the wireless WAN interface is used, there may be no physical NSP-TA device, and the logic of the gateway device would implement functions of the NSP-TA as well.

As will be described in greater detail herein below, the service management center 50 generally provides a communications and processing infrastructure for supporting the variety of application services and related communications residing at the gateway devices 10, 10$_1$ . . . 10$_n$. In an exemplary embodiment, this infrastructure may be configured to provide a secure environment and may be IP-based. Preferably, this support architecture is designed for high availability, redundancy, and cost-effective scaling.

The secure platform for building and providing multiple application services for digital endpoints associated with a gateway device requires connectivity between the gateway device 10 and each of a user's devices (referred interchangeably herein as "endpoint devices" or "digital endpoint devices"). This connectivity may be provided by implementation of one or more USB ports (interfaces) 13, a wired Local Area Network connection such as provided by an Ethernet local area network (LAN) interface 16, or, a wireless network interface via a WiFi LAN access point 62 provided, for example, in accordance with the I.E.E.E. 802.11 b/g/n wireless or wireless network communications standard. These physical interfaces provide the required network interconnectivity for the endpoint devices to connect to the multiple application services. Although not shown in FIG. 4, this connectivity between digital endpoint devices and the gateway device may be accomplished by other means, including, by way of example, through of a virtual private area network connection accessed through a WAN interface.

That is, the gateway device 10 interfaces with digital endpoint devices including, but not limited to: a home automation networking device 20 (e.g. X10, Z-Wave or ZigBee) for wired or wireless home network automation and control of networked home devices such as a switch controller 22, sensor devices 23, automatically controlled window blinds 24, a controlled lighting or lamp unit 25 etc, individual or wired or wireless network of personal computing (PC) and laptop/mobile devices 30a, . . . , 30c that serve as file sources, control points and hosts for various other client endpoints, one or more television display devices 32 including associated set top boxes (STB) 35a or digital media adapters (DMA) 35b, one or more VoIP phone devices (e.g. SIP phones) 40, or other devices (not shown) that convert IP interfaces to PSTN FXO and FXS interfaces.

As noted earlier, the gateway device 10 may provide an interface 35b to the Digital Media Adapter (DMA) for television (TV) 32, which enables bidirectional wireline or wireless communication. This interface supports several functions for multiple services including, but not limited to: media (e.g., video and music) by enabling the transfer of media (e.g., video and music) to the TV; voice services, by providing for Called Line ID and for voice mail control; and provide Home Automation Services including status and control of networked home automation devices. The DMA element 35b converts audio and video (optionally) to a format suitable for a TV. In addition, the Digital Media Adapter 35b may be capable of receiving context-sensitive commands from a remote control device (not shown) and forwarding those commands to the gateway device 10. This enables the use of menus on the TV 32 for controlling application services and various features functions thereof, as offered by the gateway device 10. For example, the Media Adapter/TV combination is able to provide the following features including, but not limited to: display of media; media control functions, when enabled (FF, REW, STOP, PAUSE, etc); display of Calling Line Identification (CLID); control of voicemail; picture viewing; control of home automation; and user functions for the gateway device 10.

A Set Top Box 35a as shown in FIG. 4 also may handle media format conversion (for example NTSC to ATSC television RF signals), digital decryption and other DRM (digital rights management) functions, and Video On Demand Purchases, etc. The Set Top Box/TV combination may thus enable, by way of example: Media format conversion (for example NTSC to ATSC); decryption; other DRM functions (such as expiry of leases), prohibition of copying to digital outputs, function restriction, etc.; Video On Demand Purchases; and media control functions (e.g., FF, REW, STOP, PAUSE, etc.).

Whether provided by the DMA interface 35b and the TV 32 or by the set-top-box 35a and the TV 32, the communications to and from the TV provide a user interface for interaction with the gateway device 10. The programming of the gateway device supports, among other things, a graphical user interface (GUI) via the TV, sometimes referred to as the "ten-foot" interface.

With respect to PCs interfacing with the gateway device 10, PCs may serve as, among other things, file sources, control points and hosts for various software clients. Thus, the PC programming may work in conjunction with the ASL and ASE programming of the gateway device. Together, the PC programming and the ASL and ASE programming provide a more comprehensive and robust user experience. The gateway device 10 may further provide a bidirectional wireline or wireless interface 35c to a PC device 30b for supporting the transfer of media (e.g., video and music) to the computer for storage and viewing; for supporting voice services, e.g., by providing for calls from SIP soft clients; for file sharing, file back-up and home storage and home automation control functions. The access point 62 offers wireless data communications with a PC 30c. The gateway device interface through any PC may provide for the bidirectional moving of files, and status and control for the endpoint devices, including for example, status and control of networked home automation devices. In addition, using the PC interface, users may, for example, share files on the gateway devices, back-up or transfer files to the gateway devices or other storage; access personal page for notifications, RSS, shared photos, voicemail, etc. In addition to the IM and SIP capabilities of the gateway device, as described more below, PCs may also serve as a host for IM and SIP soft phone clients and other client devices. The client-server interaction of the PC with the application service logic of the gateway device 10 offers an alternative GUI for at least some of the services. The PC based GUI is sometimes referred to as the "two-foot" interface.

Although not shown in FIG. 4, other digital endpoint devices for which connectivity may be established with the gateway device 10 include, but are not limited to: personal music or media players, hi-fi audio equipment with media streaming capability, game stations, Internet radio devices, WiFi phones, WiFi or other wirelessly enabled digital cameras, facsimile machines, electronic picture frames, health monitors (sensor and monitoring devices), etc.

As described in greater detail herein, the gateway device 10 includes both a hardware and software infrastructure that enables a bridging of the WAN and LAN networks, e.g. a proxy function, such that control of any digital endpoint device at the premises from the same or remote location is possible via the gateway device 10 using, optionally, a secure peer and presence type messaging infrastructure or other communications protocols, e.g. HTTPS. For example, via any IM—capable device or client 80a, 80b respectively connected with an Instant Messaging (IM) or XMPP (Extensible Messaging and Presence Protocol) network messaging infrastructure, e.g. IM networks 99a, 99b such as provided by Yahoo, Microsoft (MSN), Skype, America Online, ICQ, and the like, shown for purposes of illustration in FIG. 4, a user may access any type of functionality at a subordinate digital endpoint device at the premises via the gateway device 10 and service management center 50 by simple use of peer and presence messaging protocols. In one exemplary embodiment, a peer and presence communications protocol may be used such as Jabber and/or XMPP. Particularly, Jabber is a set of streaming XML protocols and technologies that enable any two entities on the Internet to exchange messages, presence, and other structured information in close to real time. The Internet Engineering Task Force (IETF) has formalized the core XML streaming protocols as an approved instant messaging and presence technology under the name of XMPP (Extensible Messaging and Presence Protocol), the XMPP specifications of which are incorporated by reference herein as IETF RFC 3920 and RFC 3921. Thus, the gateway device is provided with functionality for enabling a user to remotely tap into and initiate functionality of a digital endpoint device or application at the premises via the IM-based messaging framework. In addition, the gateway device 10 and network connectivity to the novel service management center 50, provides, in a preferred embodiment, a secure peer and presence messaging framework, enabling real-time communications among peers via other gateway devices $10_1 \ldots 10_n$. For instance, the device 10 provides the ability to construct communication paths between peers with formal communications exchanges available between, for example, one gateway device $10_1$ at a first premises and a second gateway device $10_n$ located at the remote premises. Thus, such an infrastructure provides for content addressing, enabling peers through remote gateway devices $10_1 \ldots 10_n$, to supply and request content such as files, media content or other resources of interest to a community of interest.

As noted above, the novel system architecture allocates the logical functionality of the ASD Platform (FIG. 1) between the gateway device 10 and the service management center 50 within an environment that enables communication and feedback at the AS Layer (FIG. 1) between the gateway device 10 and service management center 50. Thus, the gateway device 10, when operable with the service management center 50, makes possible the management of services for the digital home and facilitates the easy addition of new services or modification of existing services. Such services may include, for example, facility management (home automation), media content downloading and Digital Rights Management (DRM), device updates, data backups, file sharing, media downloading and transmission, etc., without the intermediary of a plurality of external service providers who may typically provide these individual services for every digital endpoint device in the home or premises. The programming for these services resides in the Application Service Provider Managed Applications and Platform of the UNA-DA (FIG. 2). That is, as earlier shown, the gateway device 10 is integrated with hardware and, software modules and respective interfaces that handle all aspects of home automation and digital endpoint service and management for the home in a manner without having to rely on external service providers and, in a manner that is essentially seamless to the user. This, advantageously is provided by the service management center 50 which is able to access regions of the gateway device 10 that are not accessible to the user, e.g. for controlling the transport and storing of digital content and downloading and enabling service applications and upgrades and providing largely invisible support for many tasks performed by users.

For example, with the robust capabilities of the Application Service Provider Managed Applications and Platform (FIG. 2), the gateway device 10 is capable of handling all aspects of the digital home communications, e.g. IP, voice, VoIP, phone connectivity. In this example, the service logic located and stored at the gateway device 10 may provide soft-switch functionality for implementing call-processing features at the premises (rather than the network) for voice communications, and enabling management of other service features to be described. With the provision of central office type call services and other service features provided at the gateway devices $10_1 \ldots 10_n$, a distributed soft-switch architecture is built. The ASM logical functionality of the service management center 50, in cooperation with the ASE logical functionality of the gateway device, may, among other things, provide, manage and regulate, for example, service subscription/registration, authentication/verification, key management, and billing aspects of service provision, etc. With all of the service logic and intelligence residing at the gateway device, a service provider can offer customers a broad spectrum of services including, but not limited to: media services, voice services, e.g. VoIP, automated file backup services, file sharing, digital photo management and sharing, gaming, parental controls, home networking, and other features and functions within the home or premises (e.g. home monitoring and control). Users can access their content and many of the solution's features remotely. Moreover, software updates for the in-home devices that require updating are handled in an automated fashion by the system infrastructure. The service management center infrastructure additionally provides a web interface for third-party service providers to round out the service solutions provided at the gateway device for the premises. For example, a third-party service provider other than the managed service provider associated with the service management center may be allowed access through the infrastructure to particular endpoint devices to provide additional services such trouble shooting, repair and update services.

For the in-home services, the multi-services gateway device 10 connects the various service delivery elements together for enabling the user to experience a connected digital home, where information from one source (for example, voicemail) can be viewed and acted on at another endpoint (for example, the TV 32). The multi-services gateway device 10 thus hosts the various in-home device interfaces, and facilitates the moving of information from one point to another. Some of the in-home endpoint device processing duties performed by the gateway device 10 include, but are not limited to: 1) detecting new devices and provide IP addresses dynamically or statically; 2) functioning as a (Network Address Translator) NAT, Router and Firewall; 3) providing a centralized disk storage in the home; 4) obtaining configuration files from the service management center and configuring all in-home devices; 5) acting as a Registrar for SIP-based devices; 6) receiving calls from and delivering calls to voice devices; providing voicemail services; 7) decrypting and securely streaming media having digital rights management (DRM) encoding; 8) distributing media to an appropriate in-home device; 9) compressing and encrypting files for network back-up; 10) backing-up files to the network directly from gateway device; 11) handling home automation schedules and changes in status; 12) providing in-home personal web-based portals for each user; 13) providing Parental Control Services (e.g. URL filtering, etc.); 14) creating and transmitting billing records of in-home devices including, recording and uploading multi-service billing event records; 15) distributing a PC client to PCs in the home, used in support of the various services such as monitoring events or diagnostic agents; 16) storing and presenting games that users and buddies can play; 17) delivering context-sensitive advertising to the endpoint device; and, 18) delivering notifications to the endpoint device; and, 19) enabling remote access through the web, IM client, etc. Other duties the gateway device 10 may perform include: service maintenance features such as setting and reporting of alarms and statistics for aggregation; perform accessibility testing; notify a registration server (and Location server) of the ports it is "listening" on; utilize IM or like peer and presence communications protocol information for call processing and file sharing services; receive provisioning information via the registration server; utilize a SIP directory server to make/receive calls via the SBC network element to/from the PSTN and other gateway device devices; and download DRM and non-DRM based content and facilitating the DRM key exchanges with media endpoints.

While the gateway devices 10 as described above are each equipped with various logic and intelligence for service features that enable the gateway devices to provide various integrated digital services to the premises, as described herein with respect to FIG. 3, the network-based elements of the service management center 50 supports and manages multi-services gateway devices, for instance, so as to control the accessibility to functionalities and service features provisioned in the gateway devices and the ability to communicate with other gateway devices and various digital endpoint devices connected thereto. These elements that support and manage the gateway devices 10 comprise the ASM module described above with reference to FIG. 1. These ASM elements may, for example, provide the necessary data to the ASE and ASL modules so that they may carry out their respective functions, oversee the overall integration and communication among all the modules and the services that are managed by the ASM, manages the overall security and integrity of the ASD, and maintains alarm, statistical, subscription and provisioning data, and data necessary for the integration of services from third-party service providers, e.g., media content aggregators.

Examples of various ASM functionalities performed at the service management center 50, from the Service Provider Network regime, include but are not limited to: service initialization of the gateway devices, providing security for the gateway devices and the network support infrastructure, enabling real time secure access and control to and from the gateway devices, distributing updates and new service options to the gateway devices, providing service access to and from the gateway devices and remote access to the gateway devices, but not limited to such. In support of these services, the service management center 50 provides the following additional services and features: authentication; multi-service registration; subscription control; service authorization; alarm management; remote diagnostic support; billing collection and management; web services access; remote access to gateway devices (e.g. via SIP or Internet/web based communications); reachability to access challenged gateway devices; software updates; service data distribution; location service for all services; SIP VoIP service; media services; backup services; sharing services; provisioning; gateway interfaces to other service providers (Northbound and peering); load balancing; privacy; security; and network protection.

The logical network architecture for the service management center network 50 delivering these capabilities is illustrated and described in greater detail in U.S. Provisional Application No. 60/882,865 Filed Dec. 29, 2006 entitled "A MULTI-SERVICES APPLICATION GATEWAY AND SYSTEM EMPLOYING THE SAME," and of U.S. Provisional Application No. 60/882,862 Filed Dec. 29, 2006 entitled "SYSTEM AND METHOD FOR PROVIDING NETWORK SUPPORT SERVICES AND PREMISE GATEWAY SUPPORT INFRASTRUCTURE," and the disclosures of the service management center network and its operations from those applications are entirely incorporated herein by reference.

With the gateway architecture implementing the Application Service Provider Demarcation (e.g. FIG. 2 and FIGS. 3A-3C), the demarcation in accessibility to hardware resources of the gateway device 10 delineates a portion of the storage accessible by a user via an endpoint device from an application service provider portion of the storage containing the application service programming and/or data of the application service provider. For example, the user of an associated endpoint device may be able to store and retrieve data files in the user accessible portion of the storage of the gateway device 10. The application service provider, in turn, can control storage and retrieval of data files in the application service provider portion via the of the wide area network as well as installation and configuration of various software/firmware logic modules. However, as outlined above, the user access to the logic and resources between the two demarcations is limited. The application service programming only provides a logical application service interface across the Applications Service Provider Demarcation, for delivery of one or more application services to an endpoint device. The user can obtain and use the application service and its features but can not access the underlying application service logic or its configuration data. For example, the user of the associated endpoint device is prevented from accessing one or more of the data files in the application service provider portion of the storage media. For some service applications, the application service provider can allow storage and retrieval of data files in the application service provider portion via the wide area network, for other gateway devices. Also, the logical location of the demarcation line separating the portions of the storage is controllable by the application service provider, from the service management center 50, via the wide area network 99 and the second interface. To illustrate these points, it may be helpful to consider some examples.

FIG. 5A conceptually depicts the logical demarcation in a storage media, between a portion thereof accessible by the user and a portion thereof that is accessible and controlled by the application service provider. In the example, the delineation provides isolation of downloaded service logic and associated data for implementing services from service provider and/or downloaded content from a user generated content.

As shown in FIG. 5A, the gateway device 10 includes functionality for logically combining the storage available from its own internal and attached hard drive(s) 154, with any Network Attached Storage (NAS) device 158 available via the wide area network to create a single virtual file system that consumers can use like a single drive. The gateway device 10 will automatically detect, mount and manage the connections to the NAS devices and add them to its own file system. Users of the gateway device 10 are thus presented with a single consolidated storage device that they can access just like another drive on their PC. Users will not be exposed to the underlying protocols and management features required to provide such a feature. Users no longer have to use each of the storage devices separately.

However, as further shown in FIG. 5A, a virtual demarcation 155 is enforced at the centralized disc storage device 154 of the gateway device 10, e.g., which may comprise one or more physical hard drives. The demarcation 155 is essentially the extension of the Application Service Provider Demarcation (FIG. 2) that extends through the gateway storage 154. With respect to the storage 154, the virtual demarcation 155 physically and logically isolates the storage partition or portion 156 where service logic and associated data for implementing services from the application service provider and/or downloaded media content controlled by that service provider are stored, from another partition or portion 157 where user generated data, e.g., user files, is stored. Thus, the portion 156 of storage 154 belongs to the application service provider and is accessible by the service management center 50. The application service provider can use the portion 156 for receiving logic and intelligence for the device 10, and backed-up user files, all of which is managed by the service control center 50 and enforced locally at the ASE logic in the gateway device 10. However, the other portion 157 of storage 154 is storage that is user accessible and includes a user accessible graphic user interface (GUI) which may be accessed by a digital endpoint device, e.g., a PC, programmed to enable visibility if granted to the user. Thus, the user is enabled to skew the demarcation point depending upon the amount of control granted or authorized to the user according to subscribed features and service configurations. However, the demarcation location is controlled by the application service provider. This separation within the gateway device 10 is an enabler for delivery of the service logic that resides on the device on the network side of the virtual demarcation. That is, the service provider offers all of its services upstream of this demarcation point; and the customer can choose which service is selected that is within the control of the service provider's network.

While the service center 50 is responsible for placement of service modules and data beyond the demarcation 155, the gateway device 10 is equipped with certain functional elements such as encryption techniques, local directory obfuscation techniques and local enforcement to prevent user visibility beyond the demarcation 155 that belongs to the service provider unless the user is enabled with such visibility. The intelligence and service logic that is on the gateway device 10 is managed by the service center 50 and provides the logic to limit user access.

FIG. 5B illustrates the virtual demarcation 155 within storage 154 of the gateway device 10 located on the customer premises, and this drawings provides examples of how the location of the demarcation 155 is moveable. The logic allows the customer to skew the location of the demarcation, albeit, within limits enforced by the logic managed by the application service provider. The provider also can adjust the location of the demarcation within the storage 154 on gateway device 10. The demarcation within this device can occur on a physical storage medium, e.g., a hard disk drive 154 that has been sectored for different users, or in a virtual memory location, e.g. locations 155a, 155b or 155c, based on the service levels being offered, e.g. service A, service B or service C, respectively. This approach allows the customer more flexibility in manipulating the service rendered and services offered by the provider. By allowing the demarcation closer to the customer this allows more control of features from the customer and allows the service provider closer control of the customer infrastructure without owning it all. Thus, with this device in place, the new demarcation moves based on the service.

For an example of demarcation control, if some data is required to be stored, e.g., a downloaded movie, the customer can store it locally, securely locally, or securely remotely. While it is the customer's responsibility to do storage locally and securely locally, with the virtual demarcation, the service of providing locally secure data is now part of an offering of the service provider. While the data is still on site, the data is under control of the service provider and follows service agreements for that storage of data.

As another example of demarcation control, movies may be downloaded and stored at the service provider's side beyond the demarcation 155, as requested by a user via a user interface through a device connected to the device. This user interface, enabled via the user side of the Application Service Provider Demarcation of the gateway device 10, is accessed through a PC, a TV, cell phone. After authentication, the user could select and prioritize movies to purchase for example, in compliance with the media content service provider. The choice of interfaces and amount of visibility by endpoint devices accessing this user interface may be optimally designed from a contention standpoint from the perspective of controls, security, network service control manageability, and cost. A selected movie is downloaded to the service center's portion 156 of the storage 154 as shown in FIG. 5A. Unless and until the user has purchased the movie for playback via an authentication process, that user will be prevented from accessing the content. Otherwise, the user may initiate streaming of the content directly to a digital endpoint device, e.g., a television, or will be granted permissions to download and play the movie according to the subscription with the media content provider as managed by the gateway device. If the user has purchased the movie, the movie may be transferred physically to the user storage portion 157 of the storage 154. Otherwise, the content may be temporarily copied, for local storage by the user at the user accessible portion of the demarcation point for playback at the user endpoint device.

Another example of demarcation control is the manipulation of features for a given service. Currently a subscription order is processed, and these features are manipulated within the service provider's network and sent down to the customer for provisional changes to equipment at the service center's side of the demarcation point. The location of the demarcation can be adjusted to meet storage space needs on either or both sides, as needed for various services offered to this user or even services provided to other users. Via a GUI established for the endpoint device when connected with the gateway device 10, when authenticated, files may be unlocked so the customer may locally manipulate services before and after the Application Service Provider Demarcation, thereby virtually shifting the point or location of the demarcation. Thus, a virtual demarcation allows the application service provider flexibility in offering different services and features. Examples of relevant services include, but are not limited to services such as: parental control, advertisement monitoring and replacement, home user habit monitoring, home channel monitoring, and back-up services.

One service example for use with the presently described system is a file sharing service. A general overview of this service will now be described. The functionality of controlling the file sharing service is generally provided by the file share manager and the presence and networking module, depicted in FIG. 3b. In exemplary embodiments, the system and methods of file sharing allows users to share files, for example, pictures, music, videos, documents, presentations, grocery lists, bookmarks, etc., with friends and family members or other users. The files can be shared with a user's "buddy list" or other contacts maintained at the gateway device 10 at a premises, such as the home. Once users are authenticated, gateway devices 10 may communicate with each other, for instance, using a mediated or negotiated media or data path between each. In certain embodiments, the gateway device 10 tracks functionalities that the user is enabled to do, such as being able to send photos at a digital picture frame to a buddy or other gateway device 10 of a member of a community of interest, e.g., a family or friend, or share a picture for display on a television of a buddy.

In certain embodiments, presence and peering messaging protocols such as IM-based protocols are used for sharing, and may interact from a protocol perspective, to push a file to a subordinate device at another gateway device 10, e.g., a digital endpoint such as a television or digital picture frame. To accomplish this, a negotiation is made to determine who transfers what to which device based on the stored rosters, and determine a signal path to accomplish the transfer accepting files for users in the home, and a process for acceptance of files for a particular user at the home, e.g., specific files may be accepted for some user devices to the exclusion of other devices, such as those belonging to a teenager or minor.

In this manner, for example, a file sharing (e.g., pictures, documents), movie list sharing, music playlist sharing, application sharing, video cam sharing, all can be managed by the community or network of gateway devices 10 that are designated as "buddies". The gateway device 10, in certain embodiments, maintains directories of access and sharing and which services are involved to access and transfer content.

In addition to sharing data and files with different gateway devices 10 and endpoint devices connected thereto, data and files can be shared among the endpoint devices connected to a common or same gateway device 10. Thus, for example, a photo stored on a PC 30 can be transmitted to a digital picture frame on the same gateway device network, and emails received via the PC 30 can be displayed on the television connected to the network, etc Additional examples of functionalities associated with file sharing on a gateway device may include, but are not limited to, allowing a user to tag or add comments, descriptions to the files for sharing, allowing friends and family or the like viewing the shared file to leave their comments, providing a scratchpad function to share, allowing users to share widgets, RSS feeds, and tabs on a personal page with family and friends or the like, allowing users to create slideshows with media and share them with family and friends.

File sharing functionalities can be performed manually, semi-automatically or automatically. For example, in addition to allowing users to select files and one or more user or user groups for sharing, there may be provided a personal page access or the like, which, for example, may present the user with predefined parameters for sharing such as files or folders designated previously for sharing, and a list of contacts preset for sharing. The list of contacts may have been imported from other applications such as email or IM buddy lists and/or entered manually. Thus, with a set of predefined parameters in place, file sharing may be invoked with minimum user interaction, for instance, as a single step user operations, such as a one-click function. In another aspect, file sharing functionality may be set up such that, for example, when a change or new file is detected, the file sharing is invoked automatically. For example, a file or folder may be designated as an automatic share file or folder, and if any change in the data of that file or folder is detected, file sharing is initiated automatically.

FIG. 15 illustrates exemplary processing performed during file sharing in certain embodiments. The steps need not occur in the sequence shown; rather some steps may be performed asynchronously. At 1902, a user at a user device informs its gateway device 10, referred to now as Appliance1 to identify the particular gateway device 10, that there are new files for sharing. At 1904, Appliance1 checks its storage and retrieves the new files from the user device. Sharing of files may occur via a presence and networking messaging protocol (e.g., XMPP) or other known or will be known means. The user device, for example, may be a PC or other devices that communicate to Appliance1. At 1908, notification such as email may be sent to other users notifying an available file for sharing. The email notification, for example, may include but is not limited to, an access link for accessing the file and password. At 1912, Appliance1 may also broadcast a message to group members designated for this file sharing that informs them of the new file to share. At 1914, another gateway device 10, hereafter referred to as Appliance2, and which is a member of the file sharing group, pulls the new file from Appliance1. File sharing may occur via presence and networking messaging protocol or other known or will be known means. At 1918, Appliance2 may push the new file to an endpoint device connected to Appliance2, for example, a PC, a digital picture frame, etc.

At 1920, Appliance2 sends a message to Appliance1 that the new file has been delivered to device 2's endpoint device for sharing. At 1922, Appliance2 presents summarized and updated shared files from all other users of the same group. At 1924, user 2 may request Appliance2 to download one or more files from the summary if desired. At 1926, Appliance2 requests the additional shared files from Appliance1. The request, for example, may be in the form of XMPP. At 1928, additional shared files are transferred, for instance, using XMPP or other known or will be known means. At 1930, the transferred files are pushed to user 2 at user 2's device. At 1932, Appliance2 may send a message that informs Appliance1 that the file has been delivered to user 2. Appliance1 may notify the user 1 the status of file sharing, for example, on the user 1's device.

Hence, with the disclosed system and methods, end users are able to share files with other designated end users. This is similar to the familiar buddies system in the instant messaging (IM) context, but all of the digital endpoint devices managed by the gateway device 10 are able to share files in the disclosed system, whether they are IM enabled devices or not. Once configured, the gateway device 10 arranges for and manages the sharing of files within a designated group of devices located either inside or outside the home where the sharing is done peer-to-peer and is independent of a file server. The file sharing can be extended to endpoint devices that are subordinate to or connected to the gateway device 10.

FIG. 7 schematically depicts only certain components of an exemplary system in order to explain the use of the file sharing system and methods described herein. A premises (e.g., a household) 29 may contain a gateway device 10 configured as discussed above with respect to FIGS. 1-6. A number of different endpoint devices will be associated with the gateway device 10. This includes PCs 30, 30a, a television 32, mobile or wired phones 40, 40a, and a digital picture frame 41. These particular endpoint devices are exemplary only, as other devices may be associated with the gateway device 10.

As earlier described, the gateway device 10 is connected to a network 99, such as the interne. A service management center 50 is also connected to the network 99, and has been described earlier. In this example, gateway devices 10a, 10b are connected to the network 99. For purposes of description, these gateway devices 10a, 10b will be considered endpoint devices and terminating gateway devices for files being shared through originating gateway device 10 within the premises 29. Subordinate endpoint devices can be associated with these other gateway devices 10a, 10b. For example, associated with gateway device 10a are a mobile phone 40a, a digital picture frame 41a and a PC 30b.

For those devices (e.g., PC 30a and phone 40a) that are associated with the gateway device 10, it is not required that such endpoint devices be actually physically located within the premises 29. Connection to the gateway device 10 can be made through any suitable medium, such as the network 99, and even through a terminating gateway device 10a, 10b.

In the following, the term "endpoint device" will be employed without a reference number, but this should be taken to include, without limitation, many different types of endpoint devices, such as televisions, phones, mobile phones, digital picture frames, PCs, other gateway devices, etc. Files can be shared with a digital endpoint device associated with the same gateway device 10 as the endpoint device sharing the file. Referring to FIG. 7, a file on a television 32 or a cell phone 40 can be shared to a picture frame 41, another gateway device 10a, a phone, etc. The files need not actually ever be resident (stored in persistent storage) on the endpoint device. For example, a file with which a user is interacting on the television 32 may actually be resident on the gateway device 10. Hence, endpoint devices need not have persistent storage capabilities to participate in file sharing. In certain embodiments, files can be shared with a remote digital endpoint device (e.g, picture frame 41a) associated with a different gateway device 10a registered on the system via a single step user operation, such as a "single-click" operation, by using a television interface 33, for example.

The disclosed system and methods allow for sharing of files located on a separate computer to a p2p network from a television interface 32. Exemplary files that can be shared include grocery lists shared on the television 32 and forwarded to a mobile phone 40. For example, a list can be created on a PC 30, shared with a television 32, viewed from the television 32, and forwarded to a mobile phone 40a of a spouse returning home from work. An extension of the television interface sharing is to create and/or add a channel to a set top box which is the shared content from a list of trusted friends using p2p networking and where the channel is displayed on the television interface 32. Other examples of file sharing include sharing photos with someone else's television 32 or digital picture frame 41, either on or off the user premises, sharing playlists, and sharing pictures between mobile phones 40 or from mobile phones 40 to a digital picture frame 41, and vice versa. Other examples of file sharing include sharing slideshows where gateway device users can create and share slideshows with buddies.

In certain embodiments, sharing is accomplished via a single step user operations, such as a single-click operation. The file share manager is used to configure whether file sharing is automatic, in which files are identified for sharing and automatically shared with a pre-established list. Presence and networking messaging protocol can be used to enable file sharing with devices located in the house.

Examples of the above include sending an email to a group of buddies, with the message being forwarded to the other devices through a presence and networking messaging protocol. This is different than current mechanisms because the user can create a group of buddies in one place (e.g., the gateway device 10) rather than on separate devices. Another dimension of this is to expand email buddy groups so that file sharing to other external devices happens automatically using the email buddy group.

The file sharing service provided through the file share manager allows users to share files (e.g., pictures, playlists, documents, presentations, etc.) with friends and family members. To be commercially acceptable, the sharing process needs to be simple and not time-consuming for the user. For example, files can be shared with either the user's "buddy list" or other contacts, so that choosing a contact is made simple for the user.

Certain files are optimized for sharing under control of the file share manager (FIG. 3b). For example, picture files are optimized for ease of transfer and for viewing. Other types of files can be shared as is, but if a file is beyond a certain size a warning message is presented to the user in certain embodiments that the action will take a certain amount of time for transfer to the gateway device (estimated), and that individuals viewing the file is limited by their internet access speed. An inquiry is made as to whether the user still wants to share such a large file.

Continuing with the file sharing example of picture files, in certain embodiments, people on the buddy list will receive notification of the pictures available for viewing, and simply click on the link and provide a pre-assigned password to connect to the user's gateway device 10. There is no need for a subscription in order to view the files. The user can put a description on his/her files (e.g. "This is a picture of my dog KC.") Family and friends can leave comments and ratings as they are viewing the files (e.g., "You have such a cute puppy "). The user can create a slideshow with music and share it with family and friends. The user can share to a Picture Frame connected to a gateway device 10 in friends and family's house (provided that the proper rules were set by the receiving party). The user can share to a portable device as long as it has e-mail capablity and e-mail ID associated with it. The user can use the scratchpad function to share with family and friends. The user can share widgets, RSS feeds, and tabs on their personal page with the members of the household.

In embodiments, the service provider, through the service management center 50, is able to bill for the file sharing service. The gateway device 10 therefore provides usage records from the billing manager (FIG. 3b) for file sharing service. The service provider has the capability of enabling or disabling the service. A user with administrative rights in the household is able to disable/enable service per user in the house as part of parental control (parental control manager).

Users, from their personal access pages, have a view of all their file share instances, presented by the name, date of creation, date last modified, in addition to files shared with the user. Once selected, the users are able to see the files/folders, distribution list, tags, thumbnails, size of each file, file type, size of entire share, user list, notification status, user comments and ratings, individuals that viewed the files, their comments and ratings, who has not viewed the files, who has downloaded files and which files and date of the download, a counter for how many times the share job was accessed, time expiration of the file share selection (ability to update, remove, add file share expiration timer) and ratings. The user may also, from this view, choose to Delete, Update, Add file share instances.

Initiation of file sharing is performed in several stages, in accordance with the described embodiments. These include: selecting files/folders; selecting contacts/buddies/buddy groups, whether the buddies are within or without the same household; and creating a share instance that includes selecting which files/folder to share with which contacts/buddies, what message to send out with each share instance, and select/deselect view notification.

File selection is available from anywhere that the user has access to his/her gateway device 10, provided that the files that are being shared are either on the gateway device 10 or on the same computer as the user is logging in to the gateway device 10. FIG. 7 depicts a PC 30a (which could be a laptop, for example), that is off premises but is associated with the gateway device 10, for example. The user is able to use file share by sending the gateway device 10 the file to be shared, and can control the file sharing process to share the file with a selected group of buddies.

Although much of the description has centered on exemplary embodiments in which an endpoint device associated with a gateway device 10 is sharing a file, the endpoint device sharing the file need not be associated with the gateway device 10 to share a file. For example, and in certain embodiments, with the appropriate authorization and access rights, an endpoint device associated with a gateway device 10 (including the gateway device 10 itself) may receive files being shared by other endpoint devices not associated with the gateway device 10. As stated earlier, the definition of file sharing includes many different ways to provide access to files, and does not necessarily mean a transfer of files to be resident on an endpoint device. The other endpoint devices may be on a buddy list, or an approved list, for example. This file sharing arrangement is exemplary only, as other methods and arrangements for managing such file sharing are within the scope of the present disclosure.

The user is only able to select and use the file sharing service if they have subscribed to the service. The gateway device 10 validates that the user has subscribed to the service and that the administrator has given the user access. The user is able to receive file shares from other users even if they have not subscribed to the service, provided that they are not blocked by the administrator (parental control) from receiving shares. If gateway device 10 determines that they have not subscribed to the file sharing option, then the gateway device 10 corrects the problem and notifies the user that file sharing has not been subscribed and directs them to subscribe to the file sharing service. If gateway device 10 determines that the user has not been granted access to file sharing (i.e., the household has subscribed to file sharing service, however the administrator has not granted access to the user, the file sharing was supposed to have been grayed out but it was not) then the gateway device 10 shall correct the problem (i.e., gray out file sharing on the user's personal access page, and notify the user to speak to the household administrator to receive permission to access file sharing).

Once access permissions have been validated, file share manager checks to see how much space is available for file sharing and displays the result to the user. This will be an estimate, and will not apply to files being shared that are already on the home storage folders. Then the user is prompted to select the location of the files to be shared (e.g., My Storage Folder, General Storage (these folders are on the gateway device 10, for example), My Computer, My Documents, My Pictures, Browse, etc.). The files/folders may be on the users computer and/or their home storage folders.

Once the folder location is selected, then the user is presented with the content of the selected location. File and folder selection is simple, easy to use, and graphical. File and folder selection is configured to permit for drag and drop and multiple selections. Shared files and folders are presented at the same time that the user is selecting files and folders to be shared (e.g., in the same window as the user is selecting the files and folders to be shared, the user will see what he/she has already selected). The user is able to select and unselect, and/or cancel their shared file and folder selection. File/folder selection may be through the use of radio buttons and/or highlighting the selected file/folder.

As the user is making file selections, certain embodiments provide the user with an indication of the amount of space remaining for their file sharing. In other words, users are presented with space available and as the users are selecting the files they see how much space the files being shared require. If possible the size shown should be for an optimized version, if not possible then the actual size. In addition, the file share manager provides the capability to remove previous share jobs in order to create more space for their new file sharing job. The user is notified or prompted that deleting file share instances that the original files resided on the PC will result in an increase in available space. If the user deletes a file share job the space available number is updated to reflect its true value.

A file sharing initiation is completed in several stages, in certain embodiments. First, files and folders are selected, followed by selecting contacts/buddies/buddy groups. Buddies can be inside the same household. A share instance is then created, which includes selecting which files/folder to share with which contacts/buddies, what message to send out with each share instance, and select/deselect view notification.

An option for the file sharing can be that the window will display source and destination panels. The content of the location selected is presented in the source panel and the other panel shall be showing "My File Share" folder and the items as they are being added, i.e., the destination panel. The two panels shall have an add and remove buttons in between. The add button shall have arrows pointing toward the destination panel and the remove button shall have arrows pointing away from the destination panel. The user shall be able to designate a new folder in the destination panel, name the folder, and select the files to be added to this new folder. Please note that on both panels, in certain embodiments, the folders have a +/− button next to them for expanding and collapsing of the folders' content. Another option, depicted in an exemplary user window in FIG. 16, is to have check marks next to each file/folder; contact/buddy, and message. The user selects files/folders, then buddies/contacts, then the message to send out, and finally, click on file share instance. When the user clicks file share instance, the check marks are reset, the file share instance is inputted into a to be shared window and the user selects the next batch of file/folders, buddies/contacts and message for the next share instance. Once all share instances are created the user will click on the Share button and instances are shared. Before the user shares, the user can select a share instance to modify or delete.

As stated earlier, the sharing of files encompasses presenting files, which is useful for when a initiates file share from a device that has no storage capability such as a television. In such circumstance, the user, through the user interface, accesses the gateway device 10, selects the files/folders, selects buddies/contacts, and the message to send out and share. The recipient of the file share, if they already have a gateway device, will have the option of either downloading the files either to their endpoint device, if the endpoint device has storage capability, or their own gateway device. If downloaded to the gateway device, then the recipient accesses the files through their user interface on their endpoint device. If the files are not downloaded, then the user through their user interface to their gateway device will access the originating gateway device 10 to view the shared files. The recipient of the file share, if they do not have a gateway, will access the originating gateway device 10 through the internet to view the files and/or download the file.

In certain embodiments, an exemplary configuration of the file sharing window will display source and destination panels to the user. The content of the location selected is presented in the source panel and the other destination panel will show a "My File Share" folder and the items as they are being added. The two panels have an add and remove buttons in between. The add button is provided with arrows pointing toward the destination panel and the remove button with arrows pointing away from the destination panel. The user is able to designate a new folder in the destination panel, name the folder, and select the files to be added to this new folder. On both panels, the folders have a +/− button next to them for expanding and collapsing of the folders' content. The panel configuration described herein is exemplary only.

The user is able to maneuver between different folders when selecting files and folder to be shared (i.e., going from My pictures to My documents.) If the user selects the browse option then they are directed to a home storage folder by default, and from there the user has the capability of searching, viewing, selecting files/folder in the home storage folders and/or PC. A search capability is provided when selecting shared files and also in the file sharing area of the gateway device 10 that allows the user to search for a certain file or folder. A variety of search capabilities (name, date, tag, Meta data, word in any of the fields, use of wild card, and file type) are provided.

File and folder selection and un-selection are provided by the file share manager to be easy to use and accessible with multiple options (i.e., drop down menu as a right mouse click option or tool bar menu option.) Once the user has completed the file and/or folder selection, then the user is able to share the data by either clicking on a button on the page and/or tool bar menu option. As stated earlier, when the user is selecting files they are presented with how much space is available (not calculating the file share instance the user is working on) and when each file/folder is selected the space required is shown.

The gateway device 10 ensures that enough space is available for the file share (if possible based on optimized file sizes, if not based on actual file size), and if space is available then the user is prompted to select the distribution list. If enough space is not available, then they are prompted to create more space by deleting previous file share instances or making the current file share instance smaller.

For each user, when selecting file sharing from their personal page, the experience is specific to that user. In other words, other users at the premises cannot see what the user has shared unless the user has given them access. For parental control purposes, the administrator has the capability of turning on or off file share feature for each user at the premises, as mentioned earlier, through the parental control. Also as part of parental control the administrator can block/unblock viewing shared files for the users in the household. Users are notified, once they start file selection, that the files are only protected by password and that sensitive data should not be shared, since there is a possibility of interception, as it is today with any IM or web sharing service. The user is able to turn off this notification after the first view (i.e. "Do not display message in the future" check box).

Once file selection is complete the gateway device 10 notifies the user of the time it will take to transfer the files, if files being shared are on the PC 30. Transfer between the gateway device 10 and home clients shall use as much bandwidth as available subject to resources available. If there is a problem during the file sharing session and file sharing is not completed the user shall receive an on screen error notification (if not logged in they shall get the notification the next time they log in to their personal page.) Also the status for the file share instance on the file share tab/page will show as errored and provide the details for the error. The system shall retry a pre-set configurable amount of time (this timer was set during the initial setup by the administrator/or system default) to complete the file sharing session. If error still occurs, the user shall receive an error notification, an alarm is sent, and a log is created. In certain embodiments, the error notification is sent to the address previously set by the user for his/her notifications.

A general requirement for file sharing service is that at any point in time, starting from when the user begins file selection to the point before completion of the file sharing, the file sharing system retains a draft copy of the file share instance either by having the user selecting a save option or if there is a system error during file share, whether on the gateway device 10 or on the user's computer 30. The next time the user logs into their personal access page, they receive an on screen notification, reminding them that they have a file share in draft mode that needs to be completed. The user is able to retrieve the draft and make changes and complete the share job. The user is provided with a configurable time expiration for maintaining file share drafts. A user configurable time expiration is associated with each file share job (i.e., allow number of weeks and/or months). The default setting is no expiration time. The user has the option to extend the timer, suspend/resume the timer, or not to turn off the timer.

For sharing inside the household, the user is able to select a task and or appointment in the calendar, or an entire calendar, and share with other users in the household or the entire household. Note that sharing within a household means with endpoint devices associated with a gateway device 10 at a premises. The endpoint devices do not have to physically be located within the premises. For example, one of the endpoint devices may be a laptop currently being used at an internet café by a member of the household. The user is able to select entire calendar and share with other users in the household or the entire household. The user is able to select a to do list or an item in the to do list and share with the users in the household or the entire household. The user is able to select a grocery list and share with the users in the household or the entire household.

Another option for sharing is a scratchpad, which appears as space on the user's access page where the user can drag and drop, add/remove items. The scratchpad is the area to develop my favorites list. The scratchpad, by default, appears on every page of the user access page. The user has the option of closing the scratchpad or opening it, moving it on the page to place it at a desired location. The user has the option of dragging and dropping music, pictures, video, slideshows, files, folders, tabs, and widgets into the scratchpad. For music and video files that are not protected, the file itself is placed in scratchpad. These can be, for example, home videos, home audio files, etc. For music and video files that are protected, only the meta data is placed in the scratchpad.

The user is able to tag an item from the television view to be placed in the scratchpad. When viewing the item from the television 32 the user will tag the item and once they go to their web personal page from their PC 30 all the information regarding the file including the file itself (provided that it is not protected) will appear in the scratchpad. The user is able to group the items to share with specific contacts/buddies or share as their favorites. The user is able to add their own comments and ratings on the items in the scratchpad.

The following describes the distribution list selection according to certain embodiments. The maintenance of the distribution list is performed by the file share manager. The gateway device 10 shall update its buddy list and contacts when a user makes a change to their email contacts and IM buddy lists. This update can take place manually, i.e., the user presses an update button on their personal access page in order to download a contact list from the email system or from an IM account to the gateway device 10. When the distribution list is presented to the user, gateway device 10 presents buddies, contacts, buddy groups, and contact groups as separate categories. Users may not view the contacts and buddies of other users who are associated with the same gateway device 10. The gateway device 10 allows the users to import other address books such as Yahoo, MSN, Google. Once the user is notified to select the distribution list, then the user is directed to a consolidated list of their buddies, contacts, contact groups, and buddy groups. The user is able to add a contact and/or e-mail, on the gateway device 10, if not present on the distribution list. If the user chooses to add a contact they are prompted with the option to add to the gateway device 10 address book or to use the contact for file share purposes. If the user adds a contact to the gateway device 10 address book, then they is notified that they would need to manually update their email contacts on their computer.

In the distribution list selection environment, the user is able to maneuver between a complete contact list and the selected contacts/buddies for sharing, while viewing both lists at the same time. The user can add or remove contacts/buddies from the distribution list via graphical user interface. The user can select multiple contacts/buddies at the same time (i.e., by using Shift Key and/or Control Key) for adding or removing. This is a similar method to file selection. A pre-grouped buddy group (i.e., family, friends, co-workers) can be selected, but the buddy group may contain certain contacts that will not be included for buddy functions in the gateway device 10. The user can select "All" buddy from their buddy list, the "All" buddy containing all the members of the household. This buddy name is used to share with all the users on the same gateway device 10, so the user does not need to select each individual user. In addition, if a share is addressed to "All", and if rules are pre-set for the All by the admin, then the shared files is viewable in the television mode, provided that the media type is supported by the television 32. The user has the ability to name the "All" buddy (e.g., Jones Residence, Our Home, Jones Family). Once the user has completed the selection, he/she shall press the OK or Complete Button to indicate completion of contact/buddy selection.

The system also provides automatic file sharing. The user has the option to designate a folder on their computer for automatic file share. The user can select contacts/buddies that have access to the automatic share folders. The user is able to designate a number of folders as automatic file share folders. Each folder may have its own distribution list and notification message. The user has the option to configure the folder to either share automatically or by manually after files are placed in the folder. In certain embodiments, automatic sharing is the default. If automatic sharing is selected, then the information placed in the folder is shared automatically with the selected distribution list. If manual is selected, after the user activates a synchronization request, the content in the automatic file share folder is synched up with the gateway device 10 and shared with the distribution list. The user has the capability of removing the automatic file share option on a folder at any time, and making changes to the distribution list of the automatic share folder.

A share creation environment is employed by the user to ensure they have selected the correct files and distribution list. In addition, in the share creation environment the user is allowed to place text tags on the files, select which user(s)/buddy(ies) have access to which file(s)/folder(s), and the message to be sent out in the notification, if any. Once the distribution list selection has been completed, then the user is directed to the file share creation environment. In the file share creation environment, the user sees the files/and folders that they have selected to be shared and the distribution list. The user is able to add and/or delete files and folders from the list (i.e., go back and edit file share, and come back to the file share creation environment.) The user is able to add and/or delete contact(s)/Buddy(ies)/buddy group(s) from the distribution list (i.e., go back and edit distribution list, and come back to the file share creation environment.) In certain embodiments, the user is able to place text tags on the files. The user is able to specify a message to be sent out in the file share e-mail (for non-gateway device 10 contacts) and notification (for gateway device 10 buddies). This message can be set to be the same for all the file sharing instances or the user is able to identify a notification message/e-mail message for each file share instance. Default is one message to all file share instances.

In certain embodiments, the user is provided the option to use a standard notification message/email message, pre-defined by the system and/or administrator. A default message to be sent out is the standard message and not the user created message. Whether the user created message is sent or the standard message, the e-mail message contains a link in order to be removed from the list. If the recipient chooses to use the "remove" link, then the originating user is notified, and the gateway device 10 removes the individual from the file share contact/buddies.

In the file share creation environment the picture files can be shown as thumbnails. The name, size, tag, file type, of all files is shown in the file share creation environment. The user has the option to turn on or off the view notification message (this is a notification that a contact has viewed the files).

Once the user has completed the necessary information in the file share creation environment, the user shall then need to indicate completion, by clicking on an OK, Complete, or Confirmed button. This may also be done from a drop down menu or tool bar menu. In the file share creation environment the user has the capability of using the radio buttons/highlight settings to identify file share selections. There is a select all files/folder and select all distribution list.

Once the user has confirmed, then the files that are not already on gateway device 10 are transferred to gateway device 10. The system shall allow the user to go back to add/remove files and/or add/remove buddies/contacts from a file sharing job after it has been confirmed. If the user removes a buddy/contact from a file sharing job distribution list, an on-screen message is presented to the user to notify them that deleting a buddy and/or contact from the distribution list after an e-mail notification has been sent out does not take back the notification e-mail. In other words, the buddy/contact would have already received the e-mail, although when he/she tries to access the file sharing, they are denied access. The removed file share recipient receives a notification/e-mail (gateway device 10 or endpoint device) that they have been removed from the file share list. There is a clean-up function for when a user has removed/added a buddy, contact, and/or buddy group from their gateway device 10 buddy list. The gateway device 10 needs to synchronize with the file share distribution list (this can be done automatically, or prompt the user to press synchronization button.). There is a capability for the user to upload to other photo sharing APIs, such as Flickr. The user will need to have a profile setup with these other photo sharing APIs already or setup the profile before using this feature on the gateway device 10. In addition, the profile will need to be imported into the gateway device 10. If the profile exists, then the gateway device 10 automatically uploads the photos onto the chosen photo sharing site.

For transferring files, once the gateway device 10 has received all the requested information from the user for the file sharing, then the gateway device 10 shall import the files that are not already on the gateway device 10. Again, using picture sharing as an example, by default, the pictures are optimized for ease of access and previews. An optimization method is selected that will have minimal impact on the CPU. The user has the option of not optimizing the pictures for sharing, but the default is set to optimize. Only the optimized version of the file is saved on the gateway device 10, if optimization is selected. If the user chooses not to optimize the picture files, then the system shall warn with a message of an estimation of how long it will take for the transfer and that the users may have issues for viewing the files based on their connection.

File sharing jobs are completed based on the resources available as defined by elements of the platform management 110, such as the resource manager. If there is a problem with PC file transfer to the gateway device 10, the user receives an on-screen notification as well as a status change in the file share instance list, and the system shall re-try transferring files for a pre-configured amount of time. The user also has the option of "retry" sending the file share instance. If still not successful then the system shall send an error notification to the user as well as an alarm and log the event.

For file sharing notification, once all the shared files are on gateway device 10 (i.e., create file share job is completed), the gateway device 10 then sends an e-mail notification to the non-gateway device 10 contacts/buddies and notification to those gateway device 10 buddies that have been given permission to access the selected files/folders. The notification can be the same notification that the originating user has sent as part of the file share creation or it can be a standard notification message displaying the name of the originating person, time of share, name of share, and a sample thumbnail picture, if supported by the device. The e-mail to the non-gateway device 10 contacts shall contain the message, if provided, set in the file share creation environment, the HTML access link for the contact/buddy to access the files/folders and a password, along with file share job size. The message can be transmitted with a special string associated with the message for security. The e-mail/notification to the gateway device 10 buddies will contain the message, if provided, set in the file share creation environment, file share job size, and HTML access link to access the file share job and a sample thumbnail of the file share job.

Buddies that are receiving file share notification, which have a gateway device 10, have several pre-configured options for notification. The gateway device 10 users set this up from their personal access page for personal notification preferences. For example, a user can receive an IM popup, if online, that informs them of the files that are being shared (e.g., John has just shared some files with you, press on the link below to be directed.) Users receive notification per their pre-configured method, such as: notification on PC 30 with thumbnails (provided media file type); notification on television 32 with thumbnails (provided media file type); files being sent to a digital picture frame 41 (provided rules are met and files shared are pictures/slideshows). They shall receive an MMS/SMS on their mobile phone 40. These are merely examples, as other notification methods can be used for the above mentioned devices as well as for other types of devices.

Figure 8:
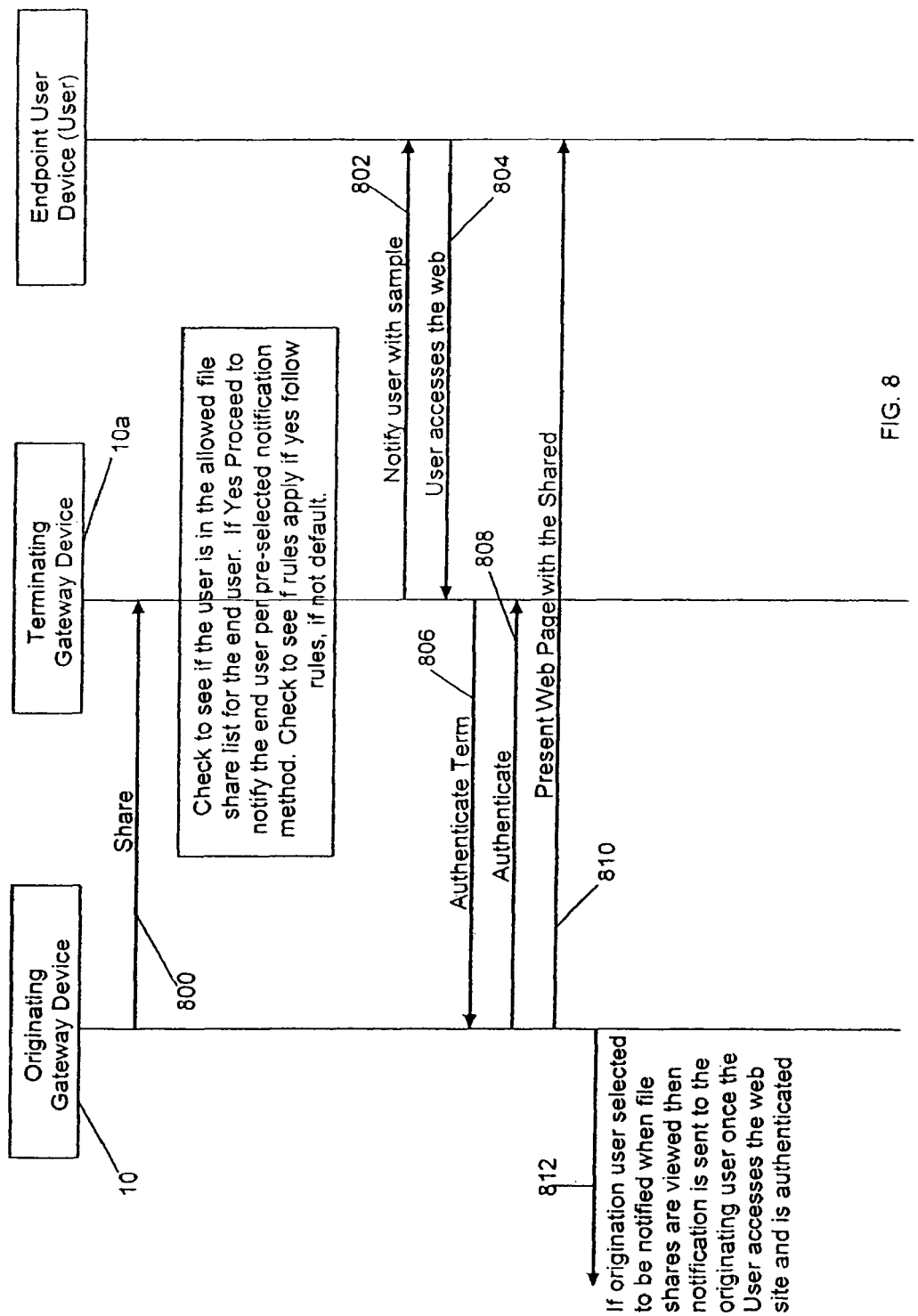

FIGS. 8-12 show various use cases to illustrate the use of the file sharing services and system for different cases. In FIG. 8, an originating gateway device 10 (also, see FIG. 7) sends a share notification message in step 800 to a terminating user's address with the web address; with the message being sent to the terminating gateway device 10a through a control channel. The gateway device 10a is associated with an e-mail contact and/or 3rd party IM Buddy (step 800). The terminating gateway device 10a will validate that the originating gateway device 10 has permission to share information with the end user. If yes, then the terminating buddy is notified in step 802 in a manner that they have selected (Personal Page, E-mail, TV notification or combination of the stated choices). If no, then the terminating gateway device 10a notifies the originating gateway device 10 with a User Access Denied Message or a notification set by the end user. The terminating gateway device 10a checks to see if there are any special rules for the originating buddy; if not, by default, the terminating gateway device 10a sends the share to the terminating user's personal page (i.e. the user will get the web address to view the file share notification); if yes, then terminating gateway device 10a follows the pre-set rule. If the rule is having the files be sent to a device and then the files are downloaded to the folder pre-selected by the user or default set by the terminating gateway device 10 and presented the next time the user turns on the device (excluding the picture frame) with a notification or a message identifying who has shared the information, at the beginning of presentation, e.g. first a message is presented that the following are pictures shared by the originating user.

The user, after being notified, accesses the web in step 804. The terminating gateway device 10a provides an authentication message to the originating device 10 in step 806, which replies with an authentication signal in step 808. Once the originating gateway device 10 receives a request to view web site or download files and they are authenticated, the originating gateway device 10 will check to see if the originating user has selected to be notified when the terminating users have viewed the shared files. If yes, then the originating gateway device 10 notifies the originating users in step 812 that the files shared have been viewed and provides the terminating user information to the originating user in the notification message. The notification will be per the originating users notification settings (i.e., e-mail, personal page, etc.). The link to the files to be shared are provided by the originating gateway device in step 810.

Figure 9:
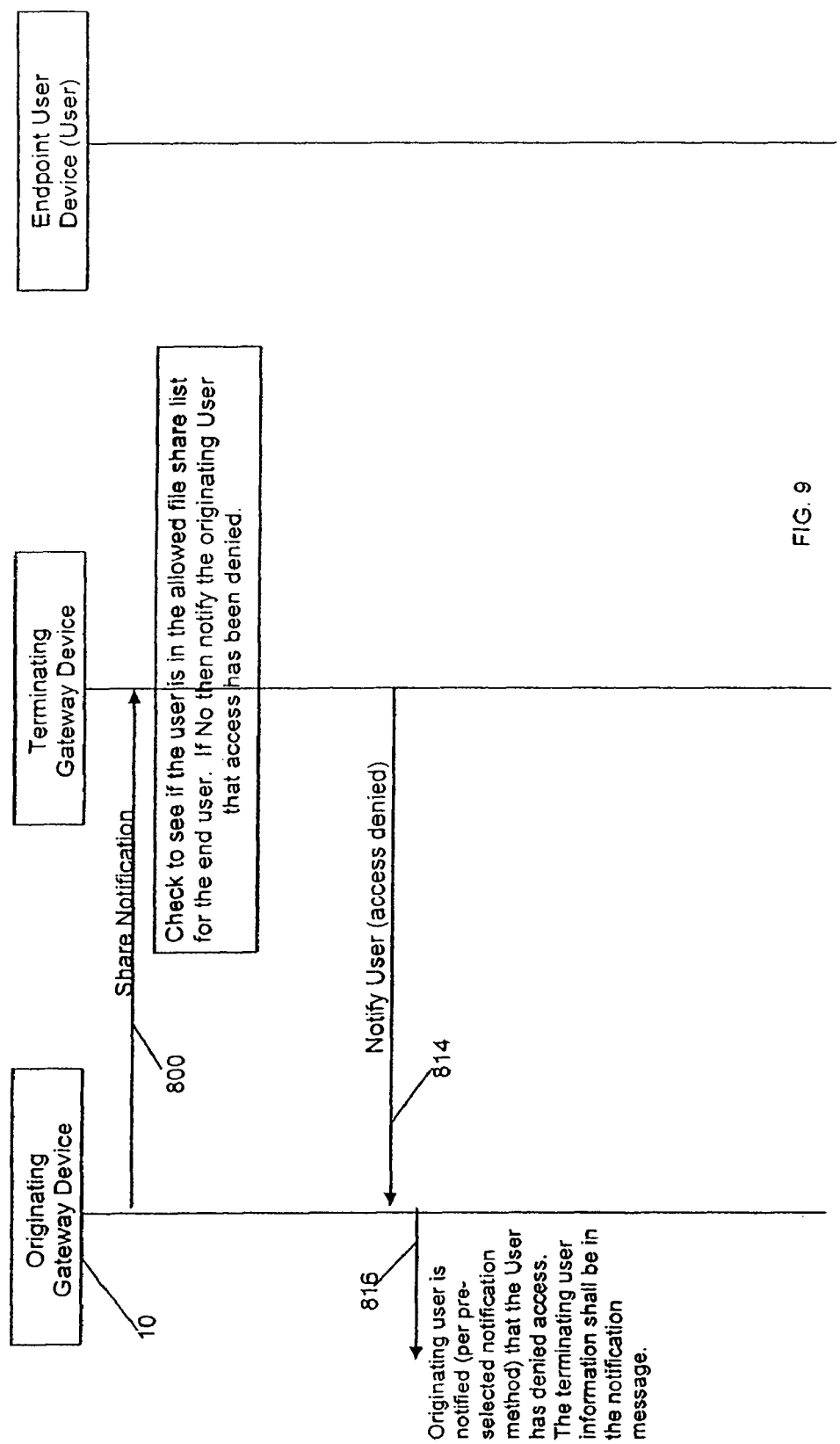

The case in FIG. 8 depicts the situation where the buddy is on the allow list and the rule is to share with personal page, i.e., to notify the buddy of the file to be shared. In FIG. 9, the buddy has either been removed, or is not allowed to share. In this case, in response to the share message (step 800) sent by the originating gateway device 10, the terminating gateway device 10a checks to see if the originating user is in the allowed file share list for the end user. In not, then a notification is sent in step 814 that notifies the originating gateway device 10 of this situation. The originating gateway device is notified in step 816, per the user's pre-selected notification method, that the terminating user was denied access. The terminating user information is provided in the notification message.

In the situation of FIG. 10, a share is made to All in a household, with a rule to share with a personal web page and a television 32. Two users are depicted in FIG. 10. Upon the share request, step 800, a check is made to determine if the user is in the allowed file share list. If yes, notification is performed by the pre-selected notification method. The users are notified in step 818, as well as the television 32. The users in the household then access the web site for the file to be shared, in steps 820. Upon authentication, the users will access the share information, and are presented with a web page with the shared files.

Figure 11:
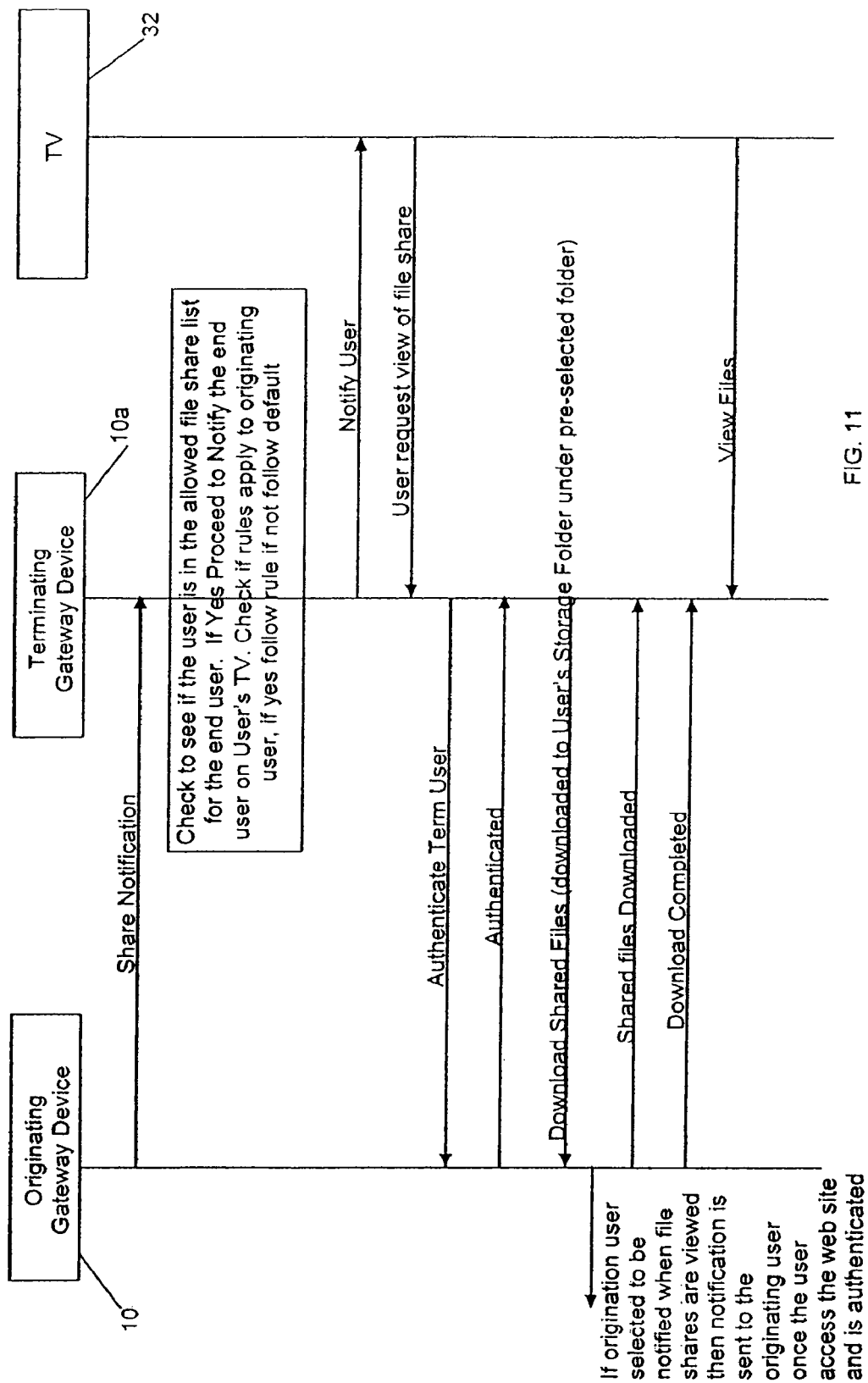
Figure 12:
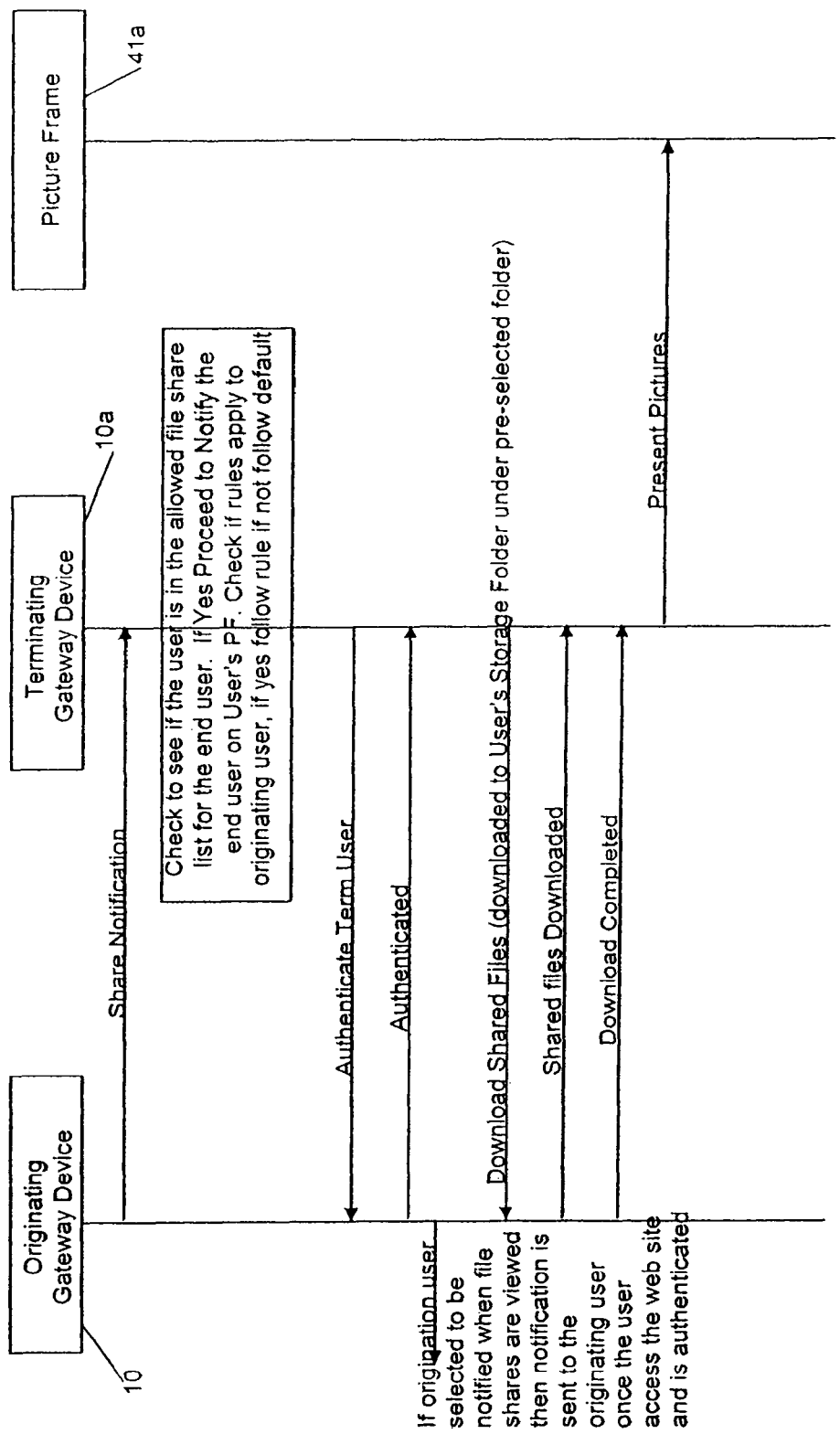

In FIG. 11, the share is to a television 32, and notification is sent to the television and the rule is to send to the television. In FIG. 12, the share is to a picture frame, and notification is sent to the terminating user's personal page, and the rule is to send the pictures to the picture frame.

In each of the cases depicted in FIGS. 8-12, for file access and viewing, the embodiments provide for contacts accessing the link to view the files/folders, to follow the link on the e-mail received. For non-gateway device 10 contacts, once the file sharing page is accessed, the individual is prompted to enter the password, per the e-mail notification. The gateway device 10 uses the control channel for initial authentication, and validates the message string in addition to the password to authenticate the user. After authentication, the individual will be presented with the files and folders. The contact/buddies has the option to download either optimized or non-optimized versions of the file, if a choice is available, such as for a picture file.

If the access can not be validated the individual has a pre-configured number of times (set by the gateway device 10 user for file share preferences) to try before being rejected. If the terminating user is rejected, they are notified to contact the gateway device 10 user that gave them access to the system. The gateway device 10 user shall receive a notification of the access error. The gateway device 10 shall support a pre-configured number of simultaneous number of external http sessions across all services. If sessions are exhausted then the user shall receive a busy notification.

In certain embodiments, non-gateway device 10 contacts/buddies viewing file share jobs, or when accessing/viewing file share jobs, receive an advertisement of the gateway device 10 and how file sharing would be different if they were a gateway device 10 user. The advertisement can be a static message/text advertisement that issues with every e-mail sent to a non-gateway device 10 contact for file share. The buddies that are also gateway device 10 user accessing the file share job, will follow the link that has popped up on their IM, personal page (based on their pre-set selection), and they will not need to enter username and/or password. The gateway device 10s will complete its user authentication automatically. The buddies that are also gateway device 10 users accessing the file share job, have access to the information from anywhere that they are able to get access to their personal page and IM.

Buddies that are also gateway device 10 users accessing the file share job, are able to view all file share jobs that they have access to in one area, categorized by file share job name. They will be able to see which files they have previously viewed. The buddies that are also gateway device 10 users accessing the file share job, have the capability of saving/downloading high resolution format of shared files. These buddies are also presented with thumbnails of the pictures being shared.

Both the user and shared contacts/buddies are able to leave comments and ratings on the files and list of comments will be presented for each file. The buddies that are also gateway device 10 users accessing the file share job, have the capability of deciding whether they want the comments of files to be presented to other people or only to the file share job originator. If they have selected to leave a private comment, then no one is able to see their comments but the originating file share user, and themselves the next time they log into the file share web page. The user, from their personal access page, per file share selection, is able to see who has been notified, notification failure, who has viewed the files, who has not viewed the files, comments, counters, and downloads.

The system provides notifications back to the user, as discussed above. The user shall receive a confirmation notification that the files have been transferred to the gateway device 10 and will be shared with the provided list. This confirmation notification can be switched off by the user during the file share creation. The user shall receive a confirmation that an e-mail message/notification has been sent out to the contacts/buddies. This confirmation notification can be switched off by the user during the file share creation. The user shall receive a notification of buddies/contacts that have viewed files.

Another feature of embodiments of the gateway device 10 is its ability to generate statistics per user for: the number of files shared in total and broken down by type of file, and the number of buddies/contacts shared to broken down by number of buddies, number of contacts In a further aspect of the invention related to file-sharing, the gateway device and support system architecture provides a hosted service-virtual space on the centralized disk storage at the gateway for users. Dedicated areas of user storage may be designated as sharable—including application level sharing for any application that has data. As shown in FIG. 3A, this virtual storage area 159 may be combined from its internal hard disc storage with any network attached storage device located at the network to create a singe virtual file system that consumers can use like a single drive.

The gateway device 10 has been described with reference to diagrams of methods, apparatus (systems) and computer program products. It will be understood that elements and functions illustrated in the diagrams, can be implemented by computer program instructions running on one or more appropriately configured hardware platforms, e.g. to operate as a gateway device 10 or as one or more systems implementing functions of the service management center 50. Hence, operations described above may be carried out by execution of software, firmware, or microcode operating on a computer other programmable device of any type. Additionally, code for implementing such operations may comprise computer instruction in any form (e.g. source code, object code, interpreted code, etc.) stored in or carried by any computer or machine readable medium.

Program aspects of the technology may be thought of a "products," typically in the form of executable code and/or associated data for implementing desired functionality, which is carried on or embodied in a type of machine readable medium. In this way, computer program instructions may be provided to a processor of a general purpose computer, special purpose computer, embedded processor or other programmable data processing apparatus to produce a machine, such that the instructions, which execute via the processor of the computer or other programmable data processing apparatus, so as to implement functions described above.

Terms regarding computer or machine "readable medium" (or media) as used herein therefore relate to any storage medium and any physical or carrier wave transmission medium, which participates in providing instructions or code or data to a processor for execution or processing. Storage media include any or all of the memory of the gateway device or associated modules thereof or any of the hardware platforms as may be used in the service management center, such as various semiconductor memories, tape drives, disk drives and the like, which may provide storage at any time for the software programming. All or portions of the software may at times be communicated through the Internet or various other telecommunication networks. Such communications, for example, may enable loading of the software from one computer into another computer, for example, from the updater 51 a hardware platform for a gateway device 10 or from another source into an element of the service management center 50. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. Hence, the broad class of media that may bear the instructions or data encompass many forms, including but not limited to, non-volatile storage media, volatile storage media as well as carrier wave and physical forms of transmission media.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The invention claimed is:

1. A system comprising:
a first gateway device located at a first user premises and operable to provide and manage services of a first endpoint device;
a second gateway device located at a second user premises and operable to provide and manage services of a second endpoint device, the second user premises being different than the first user premises; and
a third endpoint device not associated with the first and second gateway devices and not on the first and second user premises,
wherein the first gateway device includes:
a local area network interface for enabling bi-directional communications via a local area network with the first endpoint device associated with the first gateway device;
a wide area network interface for enabling bi-directional communications via a wide-area network with the second endpoint device associated with the second gateway device; and
a processor coupled to the interfaces and configured to:
manage file sharing across the wide area network through presence and network messaging communication between the first gateway device and the second gateway device,
access a file to share, the file received from the first endpoint device associated with the first gateway device, selectively make the accessed file available for sharing with the second gateway device and the second endpoint device utilizing the wide area network interface and the wide area network, manage file sharing across the wide area network through presence and network messaging communication between the first gateway device and the third endpoint device, selectively make the accessed file available for sharing with the third endpoint device utilizing the wide area network interface and the wide area network, and send a notification across the wide area network to the third endpoint device notifying the third endpoint device that the accessed file is available for sharing.

2. The system of claim 1, wherein the processor is further configured to selectively make the accessed file available to the second gateway device and the second endpoint device based on at least one list, the at least one list identifying devices to which the accessed file is to be shared.

3. The system of claim 2, wherein the first gateway device further includes storage coupled to the processor, the processor being further configured to maintain the at least one list in storage.

4. The system of claim 3, wherein the processor is further configured to send a notification across the wide area network to the second gateway device when the storage receives the accessed file to share from the first endpoint device associated with the first gateway device.

5. The system of claim 4, wherein the storage includes a sharable space configured to store the accessed file to share.

6. The system of claim 4, wherein the notification comprises one of television, telephone, e-mail, or instant message notifications.

7. The system of claim 2, wherein the processor is further configured to enforce restrictions on file sharing with respect to the second gateway device and the second endpoint device based on the second gateway device and the second endpoint device not being identified on the at least one list.

8. The system of claim 2, wherein the processor is further configured to automatically make the accessed file accessible to the second gateway device and the second endpoint device when the second gateway device and the second endpoint device are on the list and the first endpoint device associated with the first gateway device provides the accessed file to share to the first gateway device.

9. The system of claim 1, wherein the first endpoint device comprises a device selected from the group consisting of: a television, a computer, a cell phone, a phone, a digital picture frame, and another gateway device.

10. The system of claim 9, wherein the first endpoint device associated with the first gateway device includes a user interface configured to enable a user to share the accessed file with a single step user operation at the user interface.

11. The system of claim 10, wherein the single step user operation is a one-click operation.

12. The system of claim 1, wherein the sharing of the file networking and messaging communication is a peer-to-peer sharing between the first and second endpoint devices and independent of a file server.

13. The system of claim 1, wherein the sharing of the accessed file is independent of a file server.

14. The system of claim 1, wherein the first gateway device includes storage configured to receive and store the accessed file received from the first endpoint device.

15. The system of claim 1, further comprising:
a management service center in communication with the first gateway device via the wide area network and operable to control the first gateway device; and
an application service provider operable to provide an application service associated with the file to the first gateway device.

16. The system of claim 15, wherein the first gateway device further comprises:
a platform manager controlled by the service management center through presence and network messaging communication via the wide area network, the platform manager operable to:
monitor bandwidth utilization of the wide area network via the wide area network interface; and
determine whether there is sufficient available bandwidth on the wide area network for selectively making the accessed file available for sharing with the second gateway device and the second endpoint device utilizing the wide area network interface and the wide area network,
wherein if there is insufficient available bandwidth on the wide area network for selectively making the accessed file available for sharing then the platform manager throttles utilization of the wide are network interface until there is sufficient available bandwidth on the wide area network for selectively making the accessed file available for sharing;
an application service enforcement module controlled by the service management center through presence and network messaging communication via the wide area network, the application service enforcement module in communication with the platform manager and operable to enforce usage policies associated with the application service on the first gateway device at the first user premises; and
an application service logic module controlled by the service management center through presence and network messaging communication via the wide area network, the application service logic module providing logic for the execution of the application service at the first user premises, the application service logic module in communication with the application service enforcement module and the platform manager and operable to provide the first gateway device and the first end point device access to the application service when authorized by the application service enforcement module and there is sufficient available bandwidth on the wide area network,
wherein the application service enforcement module and the application service logic module establish an application service provider demarcation point that extends into the first user premises past a wide area network demarcation point for the wide area network thereby allowing the enforcement and execution of the application service on the first user premise.

17. The system of claim 16, wherein the first gateway device further comprises:
a file sharing manager in communication with the platform manager and operable to:
determine a first size of the accessed file;
determine whether the first size of the file is above a predetermined size; and
optimize the accessed file when the size is above the predetermined size, wherein the optimized accessed file includes modifying the accessed file to a second size, the second size being less than the first size.

18. A method of sharing files between a first gateway device located at a first user premises, a second gateway device located at a second user premises, and a third endpoint device, the method comprising:

determining by the first gateway device that a first endpoint device associated with the first gateway device at the first user premises has a file to share, the first gateway device in communication with a wide area network;

determining that the second gateway device and a second endpoint device associated with the second gateway device are authenticated to access the file, the second gateway device in communication with the first gateway device via the wide area network;

managing with the first gateway device the sharing of the file across the wide area network through presence and network messaging communication between the first gateway device and the second gateway device;

managing with the first gateway device the sharing of the file across the wide area network through presence and network messaging communication between the first gateway device and the third endpoint device, wherein the third endpoint device is not associated with the first and second gateway devices and not on the first and second user premises;

selectively making with the first gateway device the file available for sharing with the third endpoint device utilizing the wide area network; and sending via the first gateway device a notification across the wide area network to the third endpoint device notifying the third endpoint device that the file is available for sharing.

19. The method of claim 18, wherein the sharing of the file is a peer-to-peer sharing between the first and second endpoint devices and independent of a file server.

20. The method of claim 18, wherein the sharing of the file is independent of a file server.

21. The method of claim 18, further comprising receiving and storing at the first gateway device the file to share from the first endpoint device.

22. The method of claim 18, wherein the sharing of the file is extended to a further endpoint device that is subordinate to the second endpoint device.

23. The method of claim 18, wherein the first endpoint device includes a plurality of endpoint devices associated with the first gateway device such that the plurality of endpoint devices are enabled with bi-directional communications with the first gateway device, and wherein the sharing of the file is made accessible within the plurality of endpoint devices associated with the first gateway device.

24. The method of claim 18, further comprising maintaining at least one list of other endpoint devices with which to share the file.

25. The method of claim 24, wherein the list of other endpoint devices is based on the file.

26. The method of claim 24, wherein the list of other endpoint devices is based on the second endpoint device that has another file to share.

27. The method of claim 24, wherein the first gateway device automatically shares the file with the other endpoint devices on the at least one list when the file is provided to the first gateway device.

28. The method of claim 24, further comprising preventing receipt of the file to share by selected endpoint devices not on the at least one list.

29. The method of claim 28, further comprising automatically notifying the other endpoint devices on the at least one list when the file to be shared to the at least one list is added or changed in the sharable space.

30. The method of claim 29, further comprising selectively providing the other endpoint devices on the list with different available privileges with respect to the file to be shared in the sharable space.

31. The method of claim 24, further comprising establishing a sharable space at the gateway device into which the file to share is placed, and providing access to the file in the sharable space by other endpoint devices on the at least one list.

32. The method of claim 24, wherein the first gateway device maintains the list of at least one of the endpoint devices associated with the first gateway device.

33. The method of claim 24, further comprising determining attributes of the other endpoint devices, and wherein the managing of the sharing of the file is further based on the attributes of the other endpoint devices.

34. The method of claim 33, wherein the step of determining attributes includes at least one of: determining whether one endpoint device from the other endpoint devices is authorized to receive the file, determining whether one endpoint device from the other endpoint devices is authorized to share the file, and determining whether the file is a type of file one endpoint device from the other endpoint devices is authorized to receive.

35. The method of claim 18, further comprising:
sending, by the first gateway device, across the wide area network a notification message to the second gateway device that informs the second gateway device of the file available for sharing.

36. The method of claim 18, wherein managing with the first gateway device the sharing of the file across the wide area network through presence and network messaging communication between the first gateway device and the second gateway device further includes:
pulling, by the second gateway device, the file from the first gateway device;
storing the file on the second gateway device; and
pushing, by the second gateway device, the file to the second endpoint device associated with the second gateway device.

37. The method of claim 36, further comprising:
notifying, via the second gateway device, the first gateway device that the file has been pushed to second endpoint device.

38. The method of claim 18, wherein managing with the first gateway device the sharing of the file across the wide area network through presence and network messaging communication between the first gateway device and the second gateway device further includes:
determining a first size of the file;
determining whether the first size of the file is above a predetermined size; and
optimizing the file when the size is above the predetermined size, wherein optimizing the file includes modifying the file to a second size, the second size being less than the first size.

39. A system comprising:
a first gateway device located at a first user premises and operable to provide and manage services of a first endpoint device;
a second gateway device located at a second user premises and operable to provide and manage services of a second endpoint device, the second user premises being different than the first user premises;

a management service center in communication with the first gateway device via the wide area network and operable to control the first gateway device; and an application service provider operable to provide an application service associated with the file to the first gateway device, wherein the first gateway device includes:

a local area network interface for enabling bi-directional communications via a local area network with the first endpoint device associated with the first gateway device;

a wide area network interface for enabling bi-directional communications via a wide-area network with the second endpoint device associated with the second gateway device;

a processor coupled to the interfaces and configured to:

manage file sharing across the wide area network through presence and network messaging communication between the first gateway device and the second gateway device, access a file to share, the file received from the first endpoint device associated with the first gateway device, and selectively make the accessed file available for sharing with the second gateway device and the second endpoint device utilizing the wide area network interface and the wide area network, a platform manager controlled by the service management center through presence and network messaging communication via the wide area network, the platform manager operable to:

monitor bandwidth utilization of the wide area network via the wide area network interface; and determine whether there is sufficient available bandwidth on the wide area network for selectively making the accessed file available for sharing with the second gateway device and the second endpoint device utilizing the wide area network interface and the wide area network, wherein if there is insufficient available bandwidth on the wide area network for selectively making the accessed file available for sharing then the platform manager throttles utilization of the wide are network interface until there is sufficient available bandwidth on the wide area network for selectively making the accessed file available for sharing;

an application service enforcement module controlled by the service management center through presence and network messaging communication via the wide area network, the application service enforcement module in communication with the platform manager and operable to enforce usage policies associated with the application service on the first gateway device at the first user premises; and an application service logic module controlled by the service management center through presence and network messaging communication via the wide area network, the application service logic module providing logic for the execution of the application service at the first user premises, the application service logic module in communication with the application service enforcement module and the platform manager and operable to provide the first gateway device and the first end point device access to the application service when authorized by the application service enforcement module and there is sufficient available bandwidth on the wide area network, wherein the application service enforcement module and the application service logic module establish an application service provider demarcation point that extends into the first user premises past a wide area network demarcation point for the wide area network thereby allowing the enforcement and execution of the application service on the first user premise.

* * * * *